(12) United States Patent
     Knichel

(10) Patent No.: US 10,981,511 B2
(45) Date of Patent: *Apr. 20, 2021

(54) ADJUSTABLE VEHICLE SIDE STEP ASSEMBLIES

(71) Applicant: Dee Zee, Inc., Des Moines, IA (US)

(72) Inventor: Joshua Andrew Knichel, Altoona, IA (US)

(73) Assignee: DEE ZEE, INC., Des Moines, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/875,005

(22) Filed: May 15, 2020

(65) Prior Publication Data
US 2020/0276936 A1   Sep. 3, 2020

Related U.S. Application Data

(63) Continuation of application No. 16/170,709, filed on Oct. 25, 2018, now Pat. No. 10,688,933.

(60) Provisional application No. 62/578,045, filed on Oct. 27, 2017.

(51) Int. Cl.
  *B60R 3/00* (2006.01)
  *B60R 3/02* (2006.01)
  *F16B 7/04* (2006.01)

(52) U.S. Cl.
  CPC .............. *B60R 3/00* (2013.01); *B60R 3/002* (2013.01); *B60R 3/02* (2013.01); *F16B 7/042* (2013.01)

(58) Field of Classification Search
  CPC .............. B60R 3/00; B60R 3/02; B60R 3/002
  See application file for complete search history.

(56) References Cited

U.S. PATENT DOCUMENTS

| | | |
|---|---|---|
| 6,203,040 B1 | 3/2001 | Hutchins |
| 6,588,783 B2 | 7/2003 | Fichter |
| 6,874,801 B2 | 4/2005 | Fichter |
| 7,416,202 B2 | 8/2008 | Fichter |
| 7,717,444 B2 | 5/2010 | Fichter |
| 7,909,344 B1 | 3/2011 | Bundy |
| 8,403,348 B1 | 3/2013 | Wang |
| 8,641,068 B1 | 2/2014 | Bundy |
| 9,156,406 B2 | 10/2015 | Stanesic et al. |
| 9,586,527 B1 | 3/2017 | Salter |
| 9,637,178 B1 | 5/2017 | Diller et al. |
| 9,676,337 B2 * | 6/2017 | Du .......................... B60R 3/00 |
| 9,902,327 B1 | 3/2018 | Singh et al. |
| 9,937,865 B1 | 4/2018 | Oakley |
| 10,011,231 B1 | 7/2018 | Wymore |
| 2005/0179226 A1 | 8/2005 | Kolpasky |
| 2016/0355138 A1 | 12/2016 | Smith et al. |

(Continued)

FOREIGN PATENT DOCUMENTS

DE       202015100022 U1    2/2015

OTHER PUBLICATIONS

International Search Report and Written Opinion relating to International Application No. PCT/US2018/057510 dated Jan. 28, 2019.

*Primary Examiner* — Brian L Swenson
(74) *Attorney, Agent, or Firm* — Dinsmore & Shohl LLP

(57) ABSTRACT

A side step assembly includes a side bar configured to be coupled to a vehicle and a step. The step is configured to interlock with the side bar such that the step can selectively translate along the side bar while remaining coupled thereto.

20 Claims, 18 Drawing Sheets

(56) References Cited

U.S. PATENT DOCUMENTS

2018/0111562 A1   4/2018  Crandall et al.
2019/0047477 A1*  2/2019  Crandall ................ B60Q 1/323

* cited by examiner

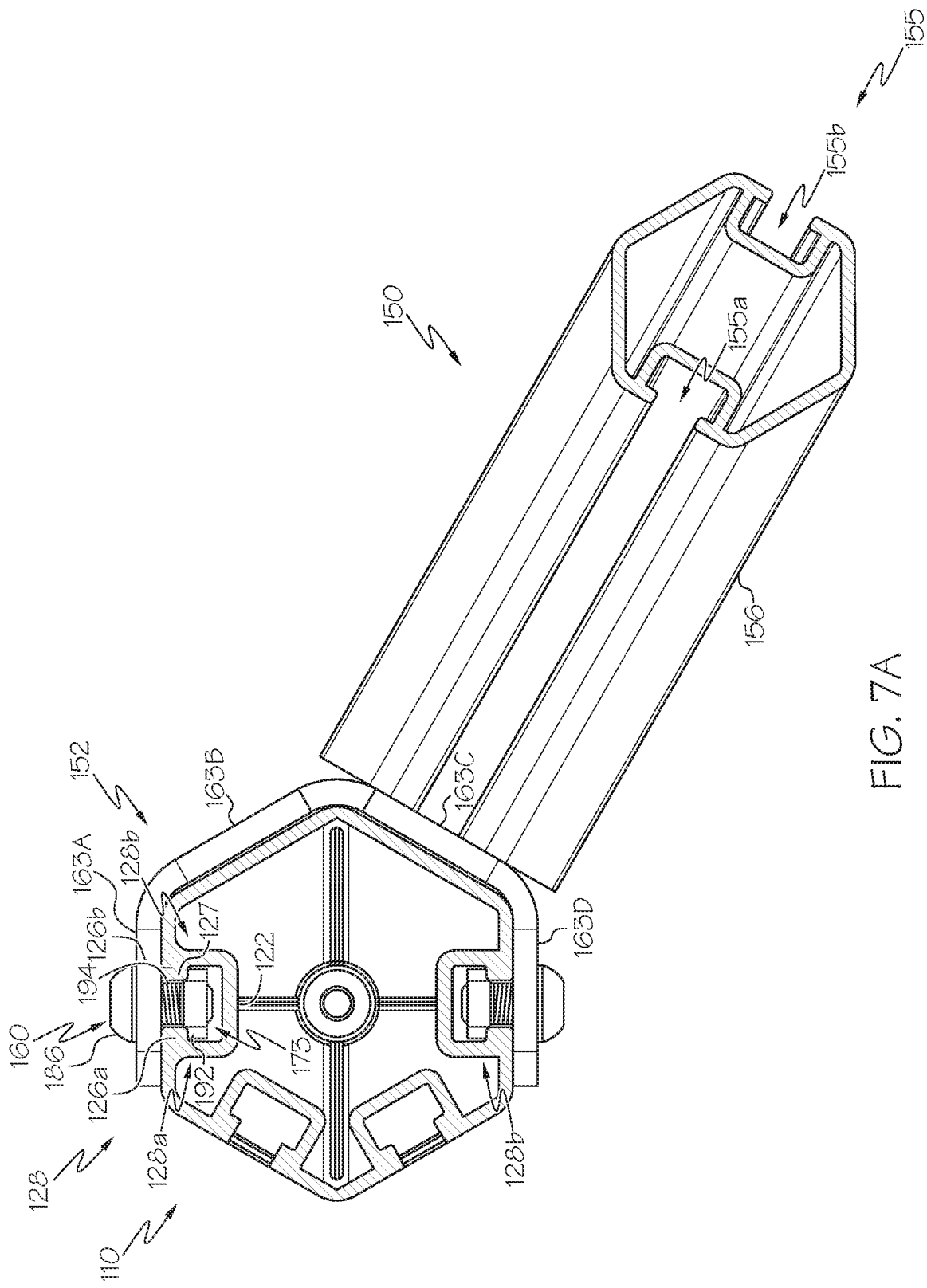

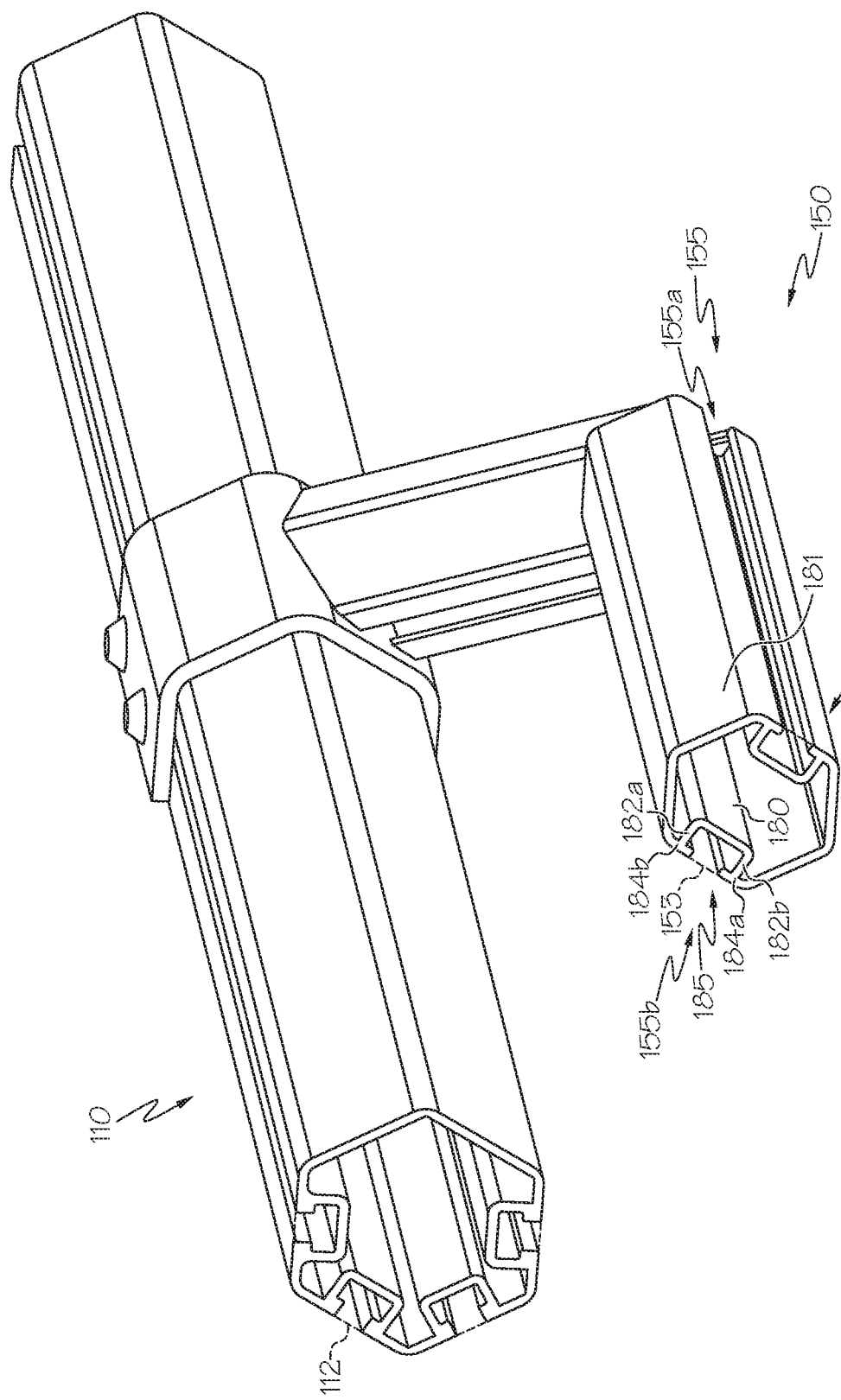

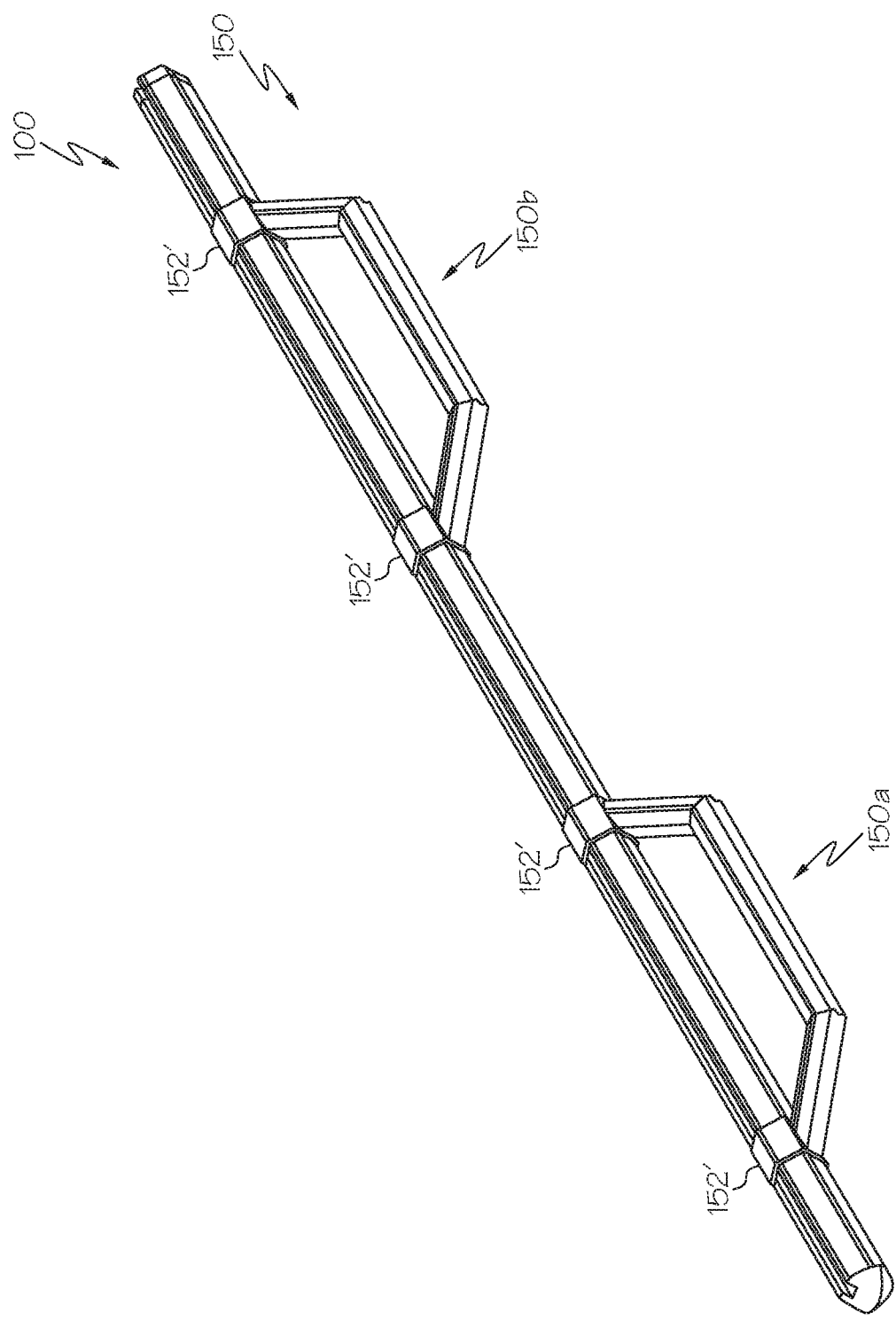

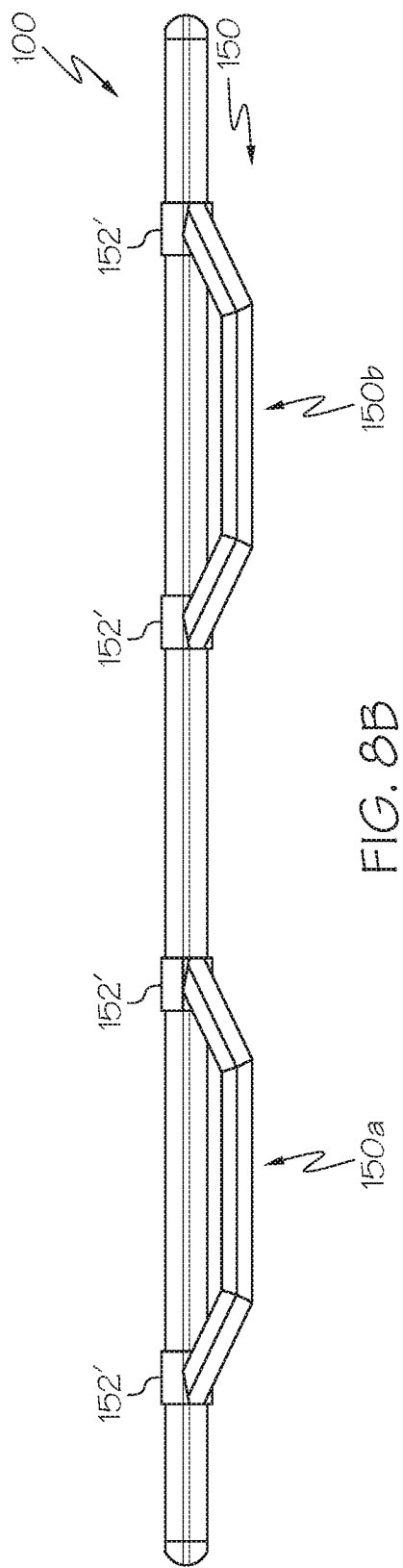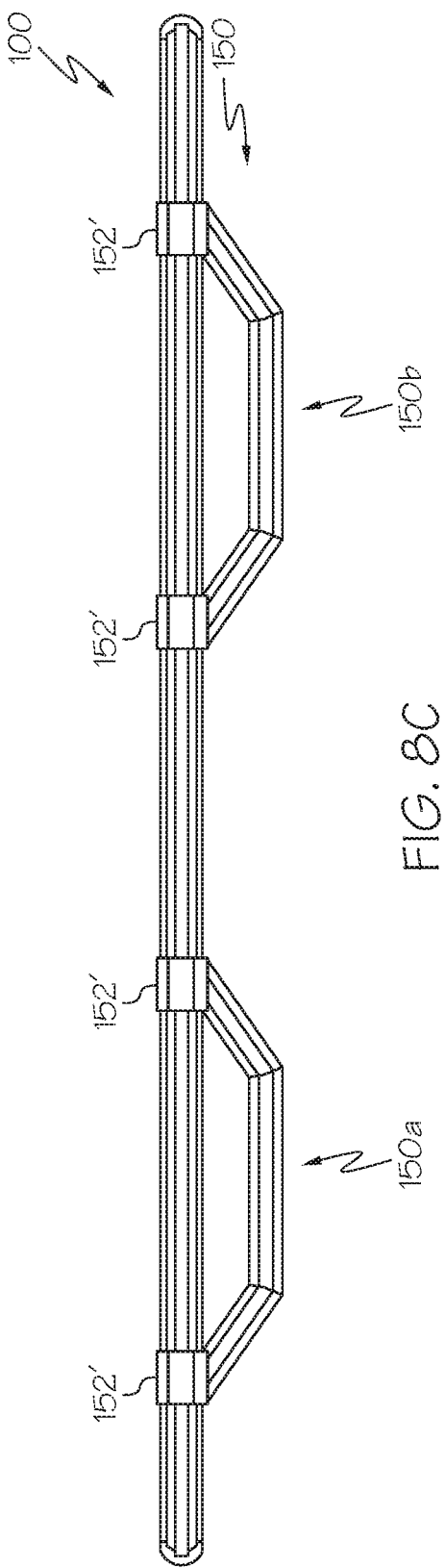

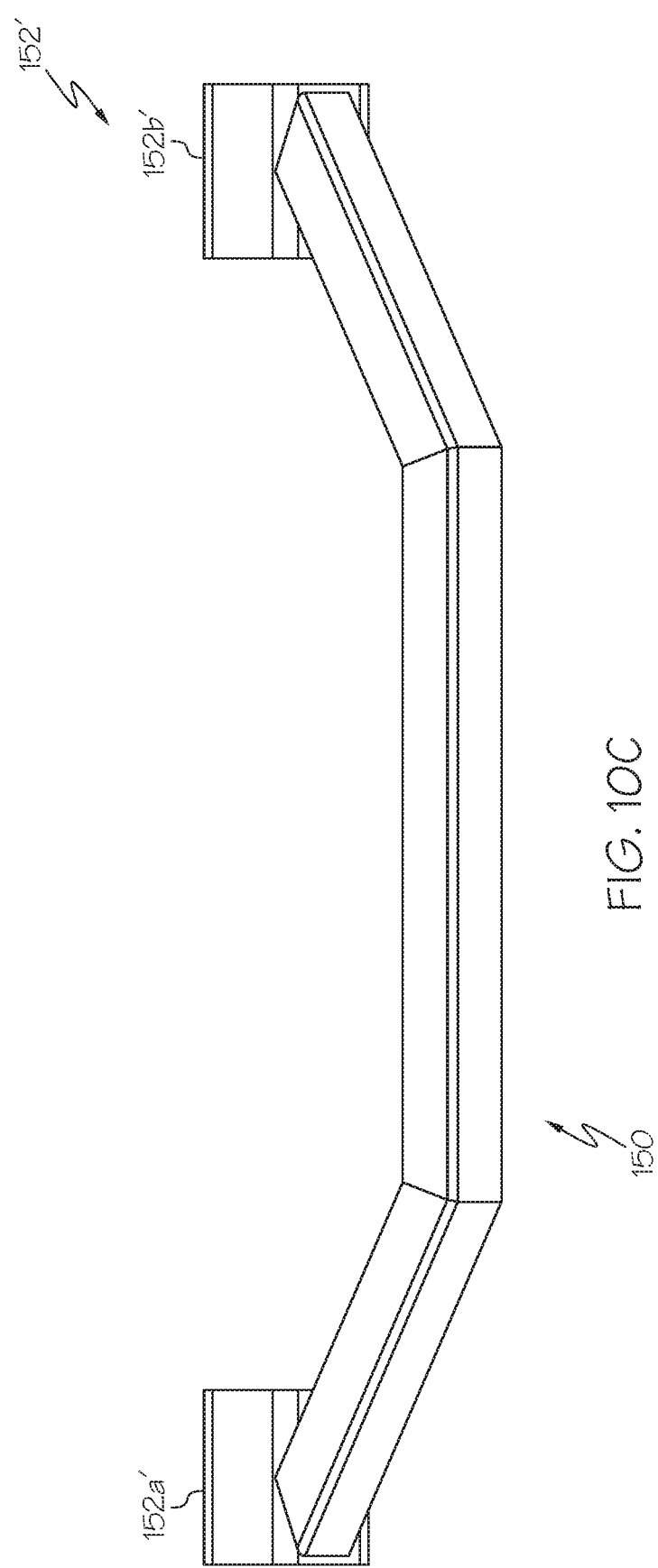

ADJUSTABLE VEHICLE SIDE STEP ASSEMBLIES

CROSS-REFERENCE TO RELATED APPLICATIONS

This application is a continuation of U.S. patent application Ser. No. 16/170,709, filed Oct. 25, 2018, which claims the benefit of U.S. Provisional Application Ser. No. 62/578,045, filed Oct. 27, 2017, the entireties of which are incorporated by reference herein.

TECHNICAL FIELD

The present specification generally relates to side step assemblies and kits for side step assemblies for vehicles and, more specifically, side step assemblies having adjustable step placement.

BACKGROUND

A vehicle side step assembly is an accessory that has some popularity among higher profile vehicles. Conventional side step assemblies generally include a side bar coupled to a vehicle. The side bar may have a step positioned near a door of the vehicle to allow for easier ingress and egress to and from the vehicle cabin. Such steps may not be placed in the ideal location for every user. That is, a shorter person may prefer the side step to be at a different location than a taller person.

Accordingly, a need exists for alternative side step assemblies having adjustable step placement.

SUMMARY

In one embodiment, a side step assembly includes a side bar configured to be coupled to a vehicle and a step. The step is configured to interlock with the side bar such that the step can selectively translate along the side bar while remaining coupled thereto.

In another embodiment, a vehicle comprising an adjustable side step assembly, comprising a side bar and a step. The side bar is coupled to a frame of the vehicle and includes a step attachment channel extending along a length of the side bar. The step includes a step coupler positioned within the step attachment channel of the side bar. The step is configured to selectively translate along the side bar while remaining coupled thereto by the step coupler.

In yet another embodiment, a method of adjusting a step along a side bar of a side step assembly includes positioning a step coupler of the step within a step attachment channel of the side bar, sliding the step to a location along a length of the side bar, which the step coupled is positioned within the step attachment channel of the side bar, and tightening the step coupled to the side bar, such that the step is immovable coupled to the side bar.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 7A depicts a cross section of the step of FIG. 6A coupled to a side bar, according to one or more embodiments shown and described herein;

FIG. 7B a cross section of the step of FIG. 6A coupled to a side bar, according to one or more embodiments shown and described herein;

FIG. 8A depicts a perspective view of a side step assembly, according to one or more embodiments shown and described herein;

FIG. 8B depicts a front view of the side step assembly of FIG. 8A, according to one or more embodiments shown and described herein;

FIG. 8C depicts a top view of the side step assembly of FIG. 8B, according to one or more embodiments shown and described herein;

FIG. 10C depicts a front view of the step of FIG. 10A, according to one or more embodiments shown and described herein;

DETAILED DESCRIPTION

The present disclosure is generally directed to vehicle side step assemblies wherein the side step can be adjusted relative to a door on a vehicle. For instance, embodiments can include a side bar configured for attachment to a side of a vehicle. A step is configured to slide over the side bar and be tightened at any desired position along the side bar to immovably couple the step to the side bar. Such side step assembly allows for a user to secure a step along the side bar at any desired position. Moreover, the side step assembly may be loosened and readjusted at any time and in a continuously variable fashion along a length of the side bar to meet the changing needs of the user. Hence, the placement of the step can be customized for any user to satisfy the needs and/or comfort of the user.

Figure 1A:
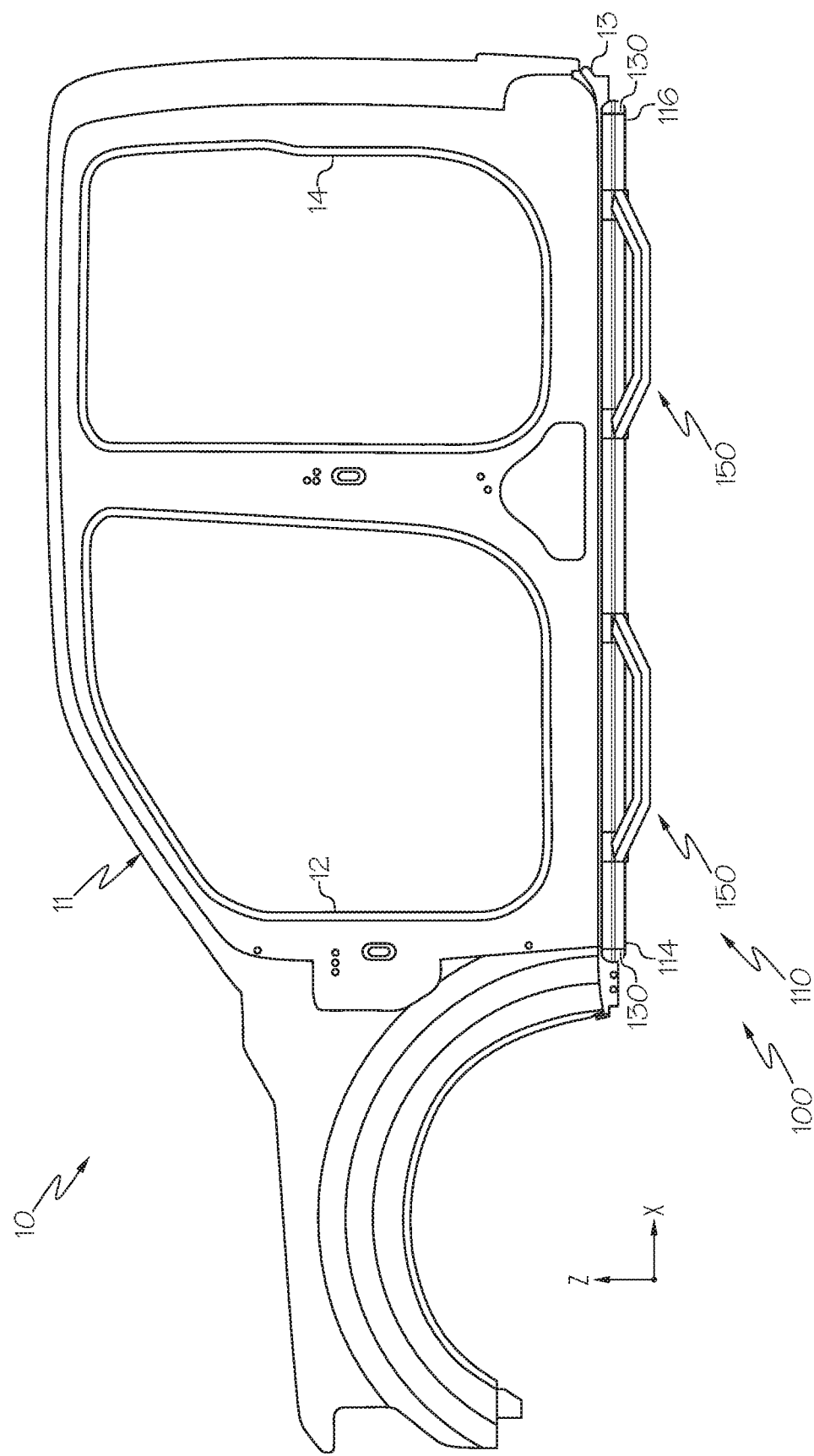
FIG. 1A depicts a perspective view of a side step assembly coupled to a frame of a vehicle, according to one or more embodiments shown and described herein.
Figure 1B:
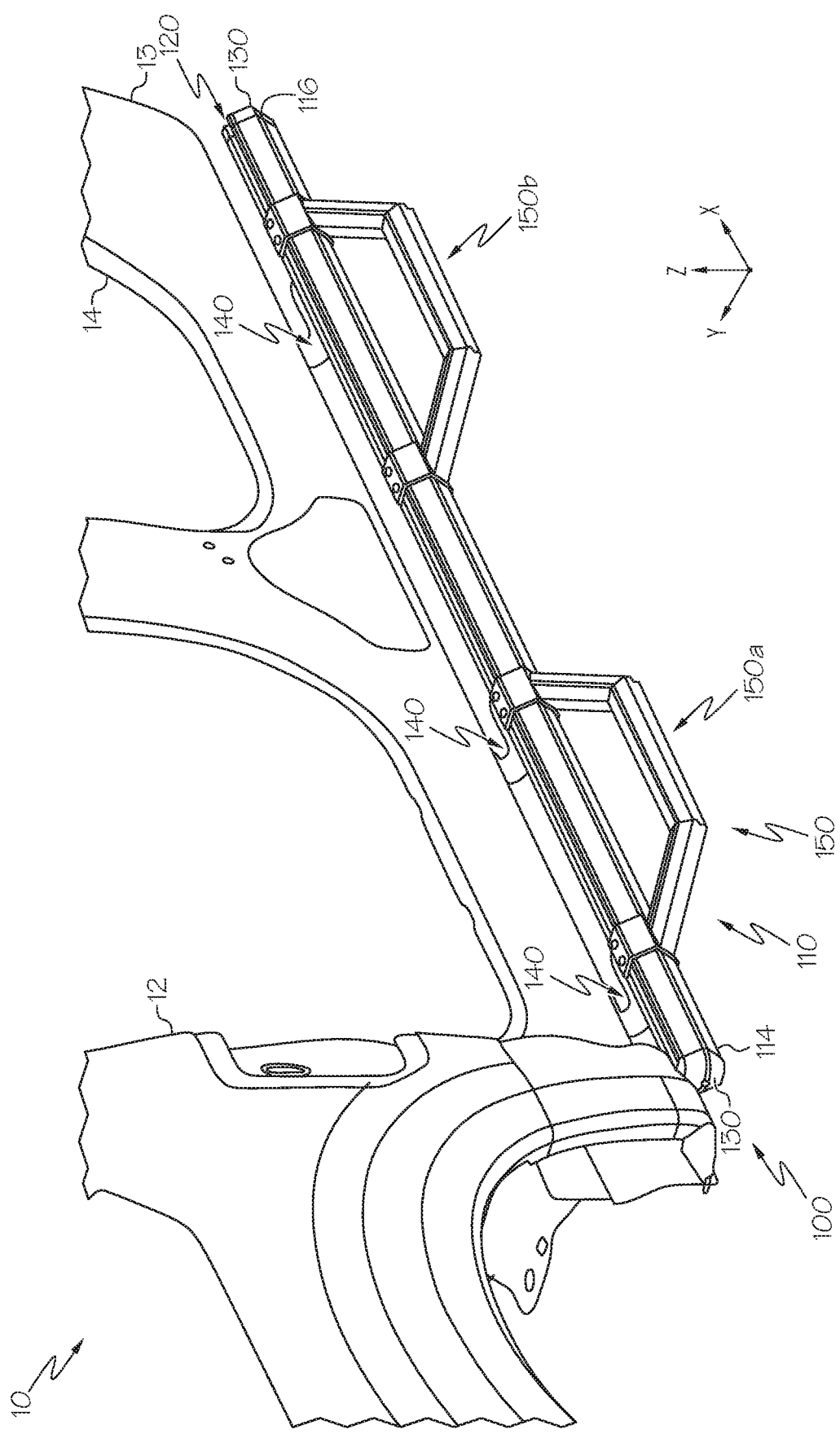
FIG. 1B depicts a side view of a side step assembly coupled to the vehicle of FIG. 1, according to one or more embodiments shown and described herein.

Referring now to FIGS. 1A and 1B, a side and perspective view of a vehicle 10 with a side step assembly 100 coupled thereto are respectively illustrated. The side step assembly 100 may be provided to a user as a kit for the user to assemble and attach to a frame 13 of the vehicle 10. For example, such kit may include a side bar 110, end caps 130, one or more attachment brackets 140 for coupling the side bar 110 to a user's vehicle, and one or more steps 150. Suitable hardware (e.g., nuts, bolts, washers, and the like) may also be included for assembling the side step assembly 100 to the vehicle 10 along with instructions for installation. It is noted that though the vehicle 10 illustrated in the figures appears to be a truck, vehicles according to the present disclosure may be any type of vehicle including but not limited to, cars, trucks, sport utility vehicles, busses, recreational vehicles, and the like.

The side bar 110 is illustrated as an elongate bar extending along a majority of the passenger cabin 11 such that the side bar 110 extends under both a front passenger door opening 12 and a back passenger door opening 14. However, it is contemplated that the side bar 110 may be any length suitable for supporting a step 150 thereon. For example, in some embodiments the side bar 110 may only extend a width of a vehicle door opening. In other embodiments, the side bar 110 may extend beyond the passenger cabin 11 toward a rear of the vehicle 10. For example, wherein the vehicle 10 is a truck, it may be desirable for the side bar to extend along a portion of the truck bed such that the side step assembly 100 can be used for accessing the truck bed. At either end (114, 116) of the side bar 110 may be an end cap 130 coupled thereto.

Figure 3A:
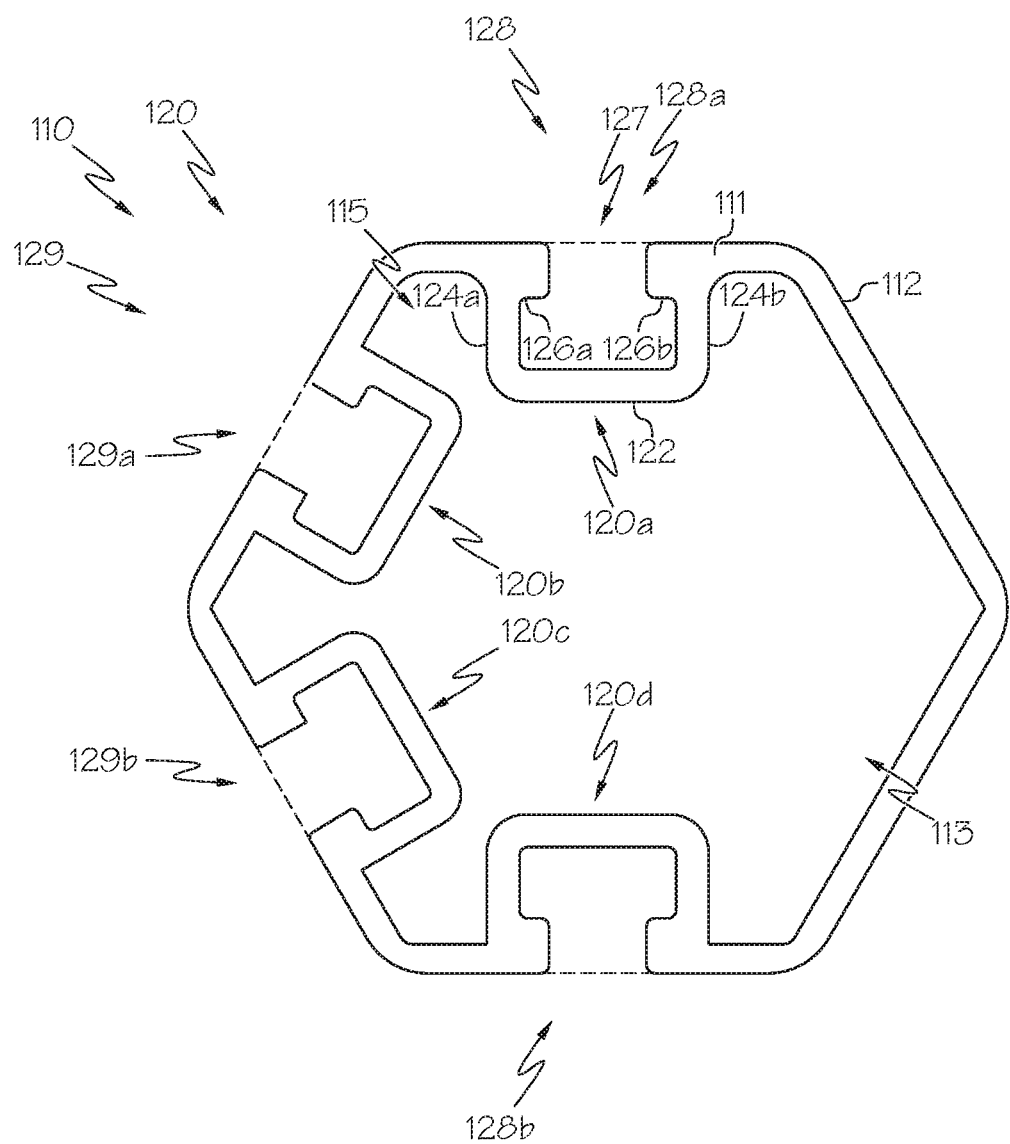
FIG. 3A depicts a cross section of a side bar of the step assembly of FIG. 1, according to one or more embodiments shown and described herein.

The side bar 110 may be a hollow tube constructed of any suitable material, for example, aluminum, steel, plastic, and the like. The side bar 110 may be manufactured through any suitable process, for example, extrusion. FIG. 3A illustrates a cross-sectional view of the side bar 110 in isolation from the rest of the side step assembly 100. The side bar 110 may comprise an outer cross-section perimeter 112 (as indicated by the solid and dashed lines). The outer cross-section perimeter 112 of the side bar 110 may be any suitable polygonal or non-polygonal shape (e.g., triangles, squares, rectangles, circles, ovals, etc.). In the present embodiments, the outer cross-section perimeter 112 of the side bar 110 is a hexagonal shape.

Extending inward from the outer cross-section perimeter 112 of the side bar 110 are one or more channels 120. Referring also to FIG. 1A, the one or more channels 120 may extend along an entire length of the side bar 110 from a first end 114 to a second end 116. In some embodiments, the side bar 110 comprises more than one channel 120 for example, two channels, three channels, four channels, etc. The illustrated embodiment, as shown in FIG. 3A, includes four channels (120a, 120b, 120c, and 120d). As will be described in greater detail herein, the one or more channels 120 may facilitate coupling of the side bar 110 to the vehicle 10 and/or coupling the one or more steps 150 to the side bar 110.

Each of the one or more channels 120 includes a base wall 122 defining a depth of the channel 120, opposing side walls 124a, 124b extending from the base wall 122 to an outer wall 111 of the side bar 110, and retaining flanges 126a, 126b extending from the side walls 124a, 124b to define a slot 127. The side walls 124a, 124b may be parallel to one another and normal to the base wall 122. The retaining flanges 126a, 126b may be perpendicular to the side walls 124a, 124b. The retaining flanges 126a, 126b may extend the entire length of the channel 120. As will be described in greater detail herein, a coupling structure (e.g., step coupler 160 or a bracket coupler 144, see FIG. 2B) may include a retained portion that sits within the channel and a neck portion that extends from the retained portion through the slot 127. The retained portion may be blocked from leaving the channel by the retaining flanges 126a, 126b. In this way, the coupling structure can translate along the channel, while remaining coupled to the side bar 110.

One or more of the channels 120 may be a step attachment channel 128 and one or more of the channels 120 may be a bracket attachment channel 129. The step attachment channel 128 and the bracket attachment channel 129 may be substantially identical to one another though arranged at different locations around the outer cross-section perimeter 112 of the side bar 110. In some embodiments, the side bar 110 may only include a step attachment channel 128.

Figure 2A:
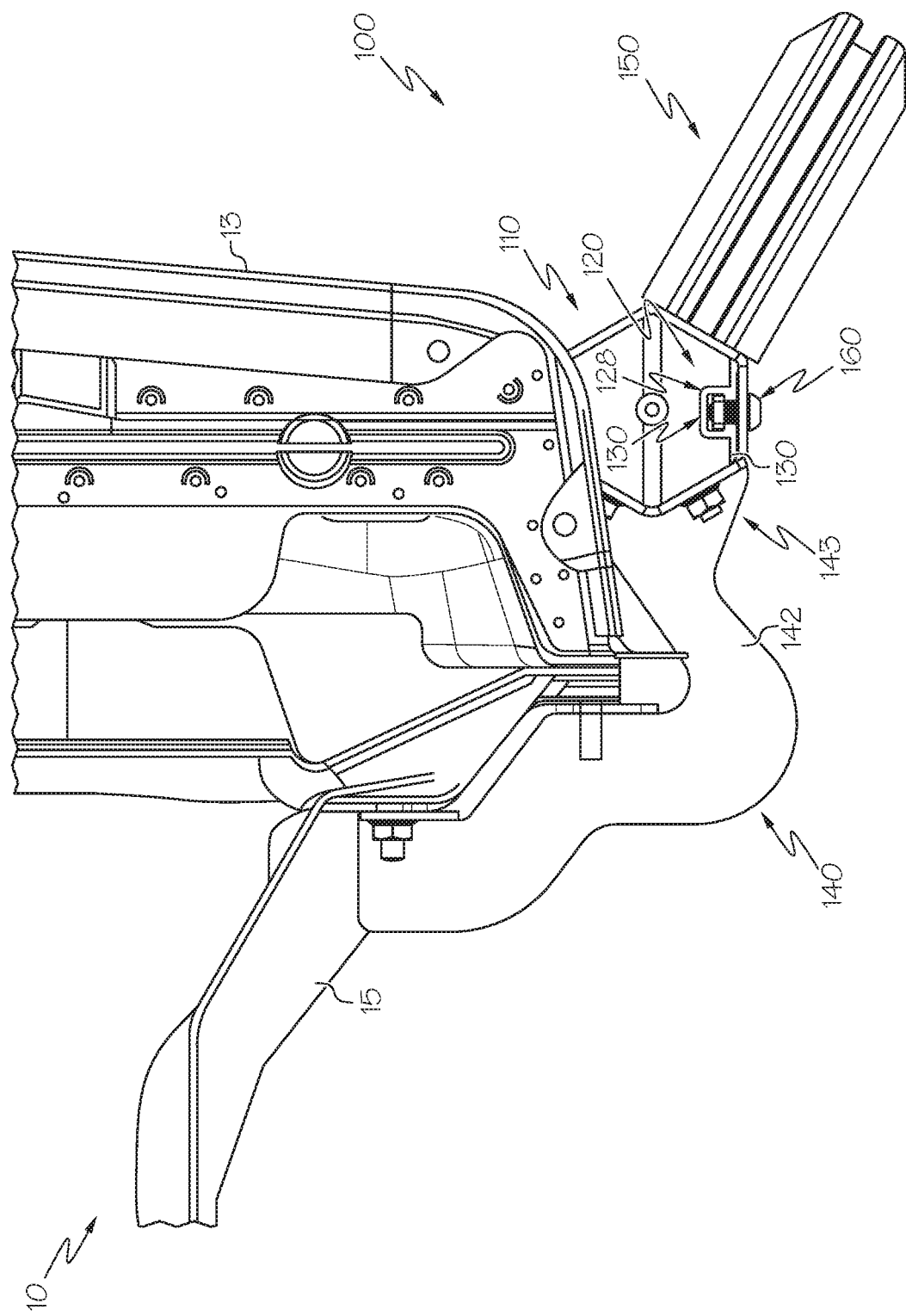
FIG. 2A depicts a front view of the side step assembly of FIG. 1, according to one or more embodiments shown and described herein.
Figure 2B:
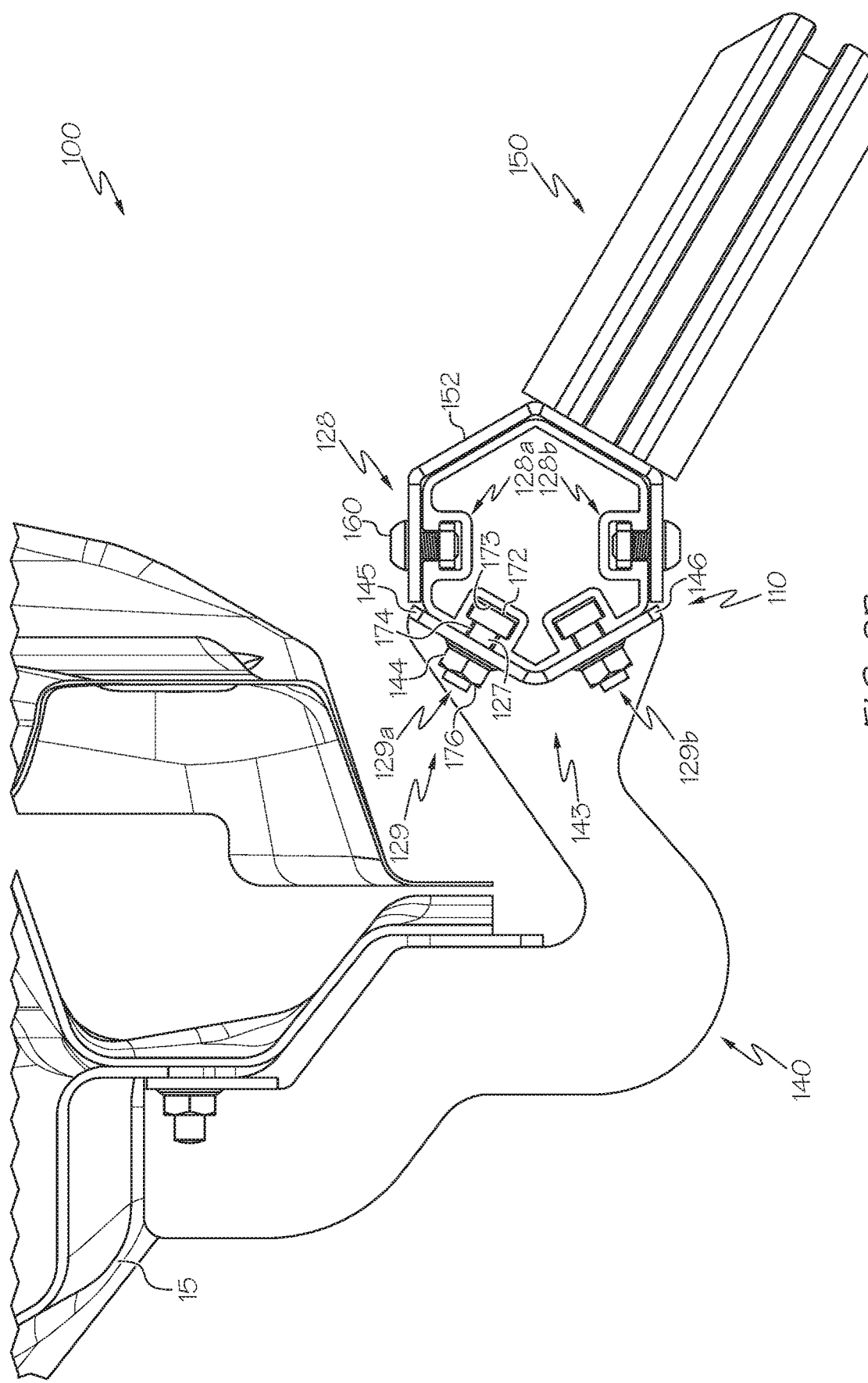
FIG. 2B depicts a cross-section of the side step assembly of FIG. 1, according to one or more embodiments shown and described herein.

Referring to FIGS. 2A-2B, various views of the side step assembly 100 coupled to the vehicle 10 are illustrated. FIG. 2A illustrates a front view of the side step assembly 100. FIG. 2B illustrates a cross-sectional view of the side step assembly 100 and Referring specifically for FIG. 2B, the step attachment channel 128 is configured to slidably couple the step 150 to the side bar 110. As with any of the one or more channels 120, the step attachment channel 128 may extend along an entire length of the side bar 110 such that a step coupler 160 coupled to step 150 can be slid into the step attachment channel 128 and slid to a desired location along the side bar 110 and tightened into place. The side bar 110 can include multiple step attachment channels 128. For example, referring also to FIGS. 2A-2B, the side bar 110 is illustrated as having two step attachment channels 128a, 128b located vertically opposed to one another as shown in FIG. 3A. However, it is contemplated that in embodiments having two or more step attachment channels, the step attachment channels can be located anywhere along the outer cross-section perimeter 112 (see FIG. 3A) of the side bar 110 so as to match the attachment structures of the step 150. The step attachment channel 128 is designed so as to secure the step coupler 160 of the step 150 within the step attachment channel 128 while allowing for lateral step movement (see FIGS. 11A-11D as an example of lateral step movement.)

The bracket attachment channel 129 is configured to allow attachment of the side bar 110 to the attachment bracket 140. As with any of the one or more channels 120, the bracket attachment channel 129 may extend along an entire length of the side bar 110. In some embodiments, the bracket attachment channel may extend along only a portion of the length of the side bar 110. The side bar 110 can include multiple bracket attachment channels 129. For example, referring also to FIGS. 2A-2B, the side bar 110 is illustrated as having two bracket attachment channels 129a, 129b located on adjacent surfaces of the side bar 110. However, it is contemplated that in embodiments having two or more bracket attachment channels, the bracket attachment channels can be located anywhere along the outer cross-section perimeter 112 (see FIG. 3A) so long as it does not interfere with translation of the step 150 as will be described in greater detail herein. In some embodiments, there may not be a bracket attachment channel 129. In such embodiments, the side bar 110 may be directly coupled to the attachment bracket 140 through any conventional coupling technique including, but not limited to, welding, magnetism, adhesives, and the like.

Figure 3B:
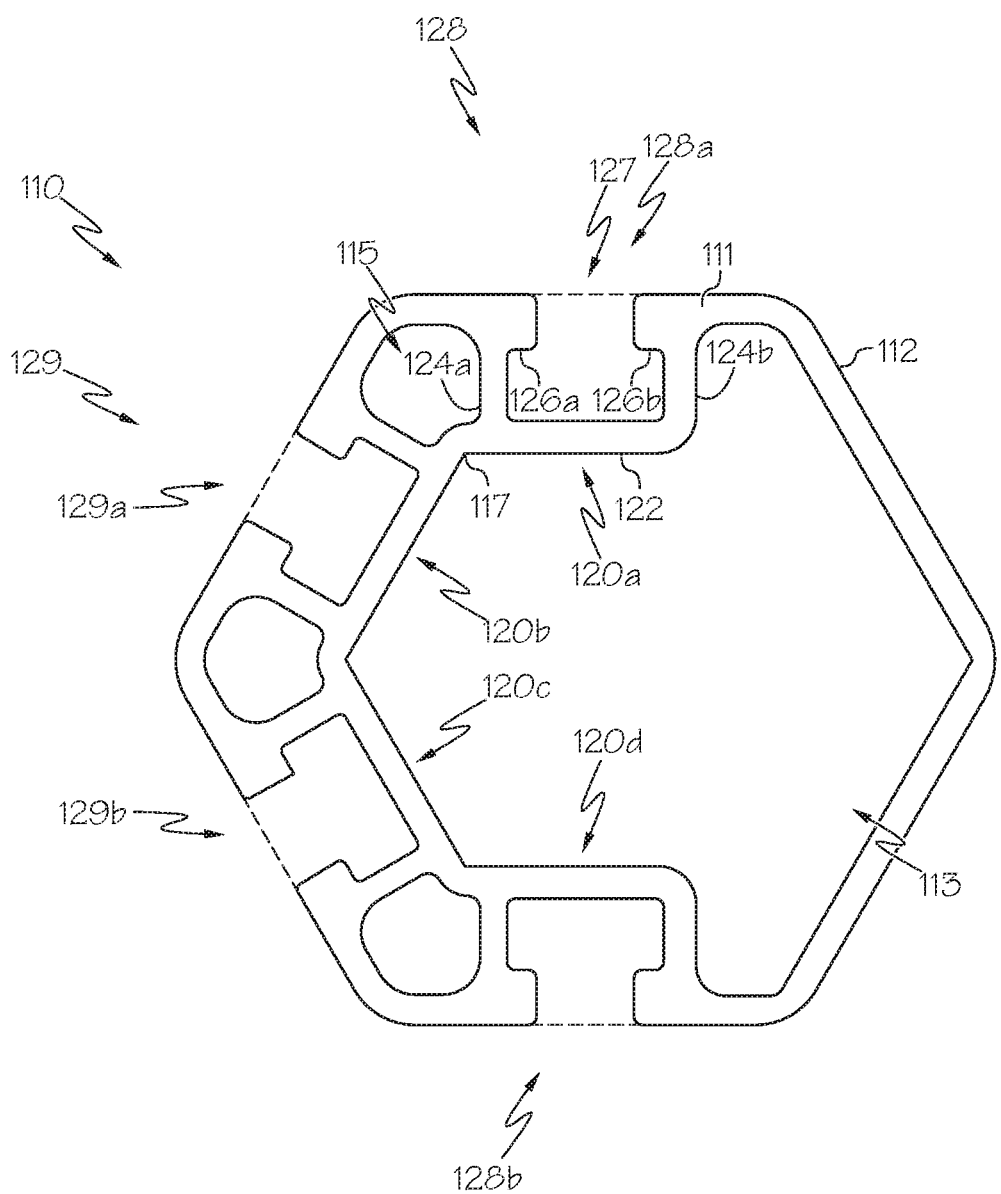
FIG. 3B depicts a cross section of a side bar of the step assembly of FIG. 1, according to one or more embodiments shown and described herein.

Referring again to FIG. 3A, the one or more channels 120 formed within the side bar 110 may cause one or more pockets 115 to be formed within the side bar between adjacent channels. The one or more pockets 115 may be left open to a central hollow 113 of the side bar 110. However, referring now to FIG. 3B, where additional stiffness of the side bar 110 is desired, the one or more pockets 115 may be closed off by a stiffening wall 117. By closing off the one or more pockets 115 formed between adjacent channels with the stiffening wall 117, the rigidity of the side bar 110 can be improved which may allow for production of longer side bars. Moreover, a side bar 110 with improved stiffness may require fewer attachment brackets to support the side bar 110. However, it is noted that where the one or more pockets formed between adjacent channels are left open as shown in FIG. 3A, material cost savings can be achieved as additional material (i.e., the stiffening wall 117 from FIG. 3B) needed to close off the pockets 115 is unnecessary.

Referring again to FIGS. 2A-2B, the side bar 110 is coupled to the vehicle 10 through the attachment bracket 140. The attachment bracket 140 can have a variety of configurations for attachment to the vehicle 10. The attachment bracket 140 may be modified depending on the make and model of the vehicle 10. For instance, a truck of a certain make and model may have an attachment bracket 140 of a different configuration than an attachment bracket 140 for a truck of a different make and/or model. In the present embodiments, the attachment bracket 140 is coupled to a portion of a frame 13 of the vehicle 10, for example, an inner rocker panel 15. The attachment bracket 140 may comprise one or more vehicle attachment locations wherein a fastener (e.g., a bolt) is inserted through the attachment bracket 140 and the inner rocker panel 15 and secured thereto (e.g., with a nut). The attachment bracket 140 may be configured to as to be secured to the inner rocker panel 15 at one location, two locations, or more.

The attachment bracket 140 includes an arm 142 that extends from under the vehicle 10 in an outboard direction to support the side bar 110. The arm 142 of the attachment bracket 140 includes a side bar attachment portion 143 configured to receive the side bar 110. The side bar attachment portion 143 may be shaped so as to match a portion of the outer cross-section perimeter 112 of the side bar 110. For example, in the present embodiment, the side bar 110 includes a hexagonal outer cross-section perimeter 112. The side bar attachment portion 143 includes two attachment walls 145, 146 angled from one another so as to match an angle between two adjacent wall sections of the outer cross-section perimeter 112 of the side bar 110. As noted herein, though a hexagonal outer cross-section perimeter 112 is generally illustrated in the figures, it is contemplated that the side bar 110 can have other cross-sections including other polygonal (e.g., squares, rectangles, triangles, etc.) or non-polygonal (e.g., round, oblong, etc.) shapes. In either case, the side bar attachment portion 143 of the attachment bracket 140 can be shaped so as to match a portion of the outer cross-section perimeter 112 of the side bar 110 and attach to the side bar 110 where the side bar attachment portion 143 matches the outer cross-section perimeter 112 of side bar 110.

Figure 4A:
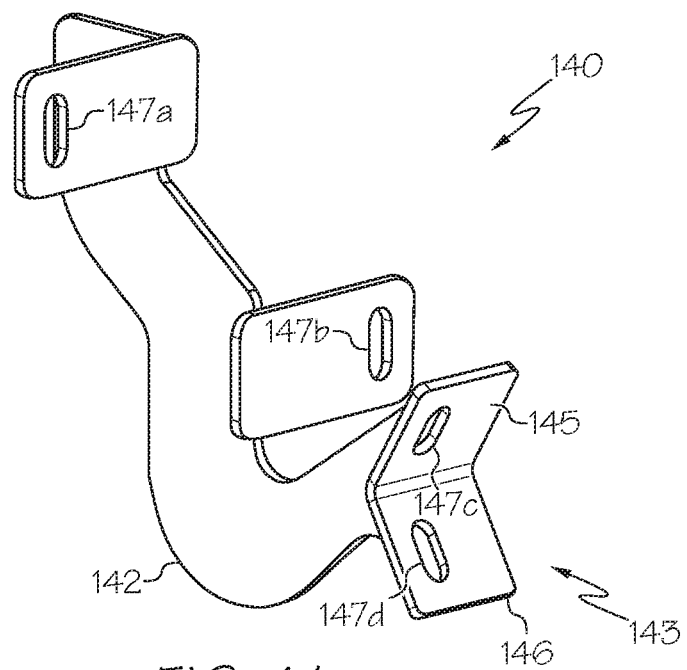
FIG. 4A depicts a perspective view of an attachment bracket of the side step assembly of FIG. 1 in isolation, according to one or more embodiment shown and described herein.
Figure 4B:
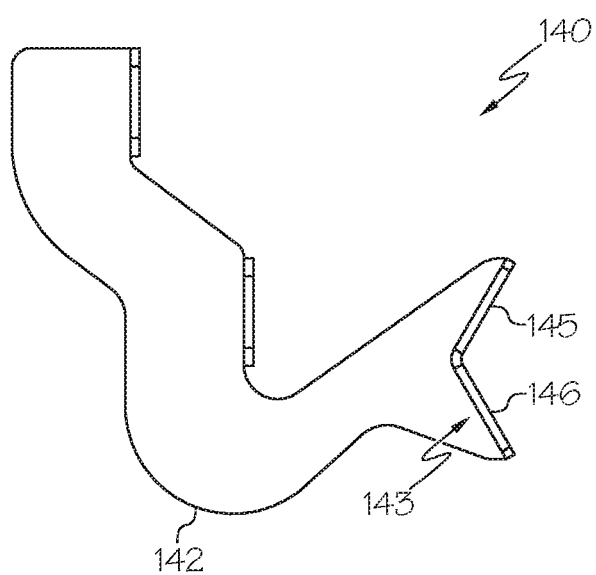
FIG. 4B depicts a side view of the attachment bracket of FIG. 4A, according to one or more embodiment shown and described herein.

FIGS. 4A and 4B illustrate an attachment bracket 140 in isolation from the rest of the side step assembly 100. As shown, the attachment bracket 140 can have various apertures (e.g., apertures 147a, 147b, 147c, 147d) formed therein to couple the attachment bracket 140 to the vehicle 10 and the side bar 110. As described above, a fastener may be inserted through an aperture (e.g., aperture 147a, 147b) of the attachment bracket 140 and the inner rocker panel 15 of the vehicle to couple the attachment bracket 140 to the inner rocker panel 15 (see FIGS. 2A-2B). The attachment between the side bar and the attachment bracket is described further below.

Referring again to FIGS. 2B and 2C, the attachment bracket 140 may be coupled to the one or more attachment bracket channels 129 formed within the side bar 110. To do so, a bracket coupler 144 may be used. The bracket coupler 144 includes a retained portion 172 that is configured to sit within a main cavity 173 of the attachment bracket channel 129 and a neck portion 174 that extends from the retained portion 172. The retained portion 172 of the bracket coupler 144 can be sized so as to be able to slide within the bracket attachment channel 129 but unable to spin. For example, the retained portion 172 of the bracket coupler 144 may have a polygonal shape (e.g., hexagon) sized such that the side walls of the bracket attachment channel 129 block rotation of the retained portion 172. A portion of the neck portion 174 may be threaded to assist with coupling the side bar 110 to the attachment bracket 140. The retained portion 172 and the neck portion 174 may be integrally formed (e.g., such as a bolt including hex bolts, tap bolts, structural bolts, and the like). In other embodiments, the retained portion 172 may be separate from the neck portion 174 (e.g., a nut coupled to an end of threaded fastener).

When the bracket coupler 144 is positioned within the attachment bracket channel 129, the retained portion 172 is located within the main cavity 173 of the bracket attachment channel 129 and the neck portion 174 is positioned within the slot 127 of the attachment bracket channel 129. The retained portion 172 is prevented from exiting the bracket attachment channel 129 by the retaining flanges 126a, 126b. The bracket coupler 144 can translate along the attachment bracket channel 129 to a location where it is desired that the side bar 110 be coupled to an attachment bracket 140. At such location, the neck portion 174 of the bracket coupler 144 can be aligned with and inserted through an aperture (e.g., aperture 147c, 147d) located on the side rail attachment portion 143 of the attachment bracket 140. A fastening element 176, such as a nut, can be tightened on the one the neck portion of the pin so as to couple the side bar to the bracket. Because the retained portion 172 is unable to rotate within the attachment bracket channel 129, tightening the fastening element 176 can cause the side bar 110 to be immovably coupled to the attachment bracket 140 such that bracket coupler 144 is no longer able to slide along the attachment bracket channel 129.

Referring again to FIG. 1B, to support the side bar 110 along the side of the vehicle 10, there may be several attachment brackets 140. In the present embodiment, three attachment brackets are illustrated coupling the side bar 110 to the side of the vehicle 10. The number of attachment brackets needed to support the side bar may depend on the make and model of the vehicle 10. For instance, a truck of a certain make and model may need a fewer or greater number of attachment brackets for supporting the side bar 110 than a truck of a different make and/or model.

Figure 5:
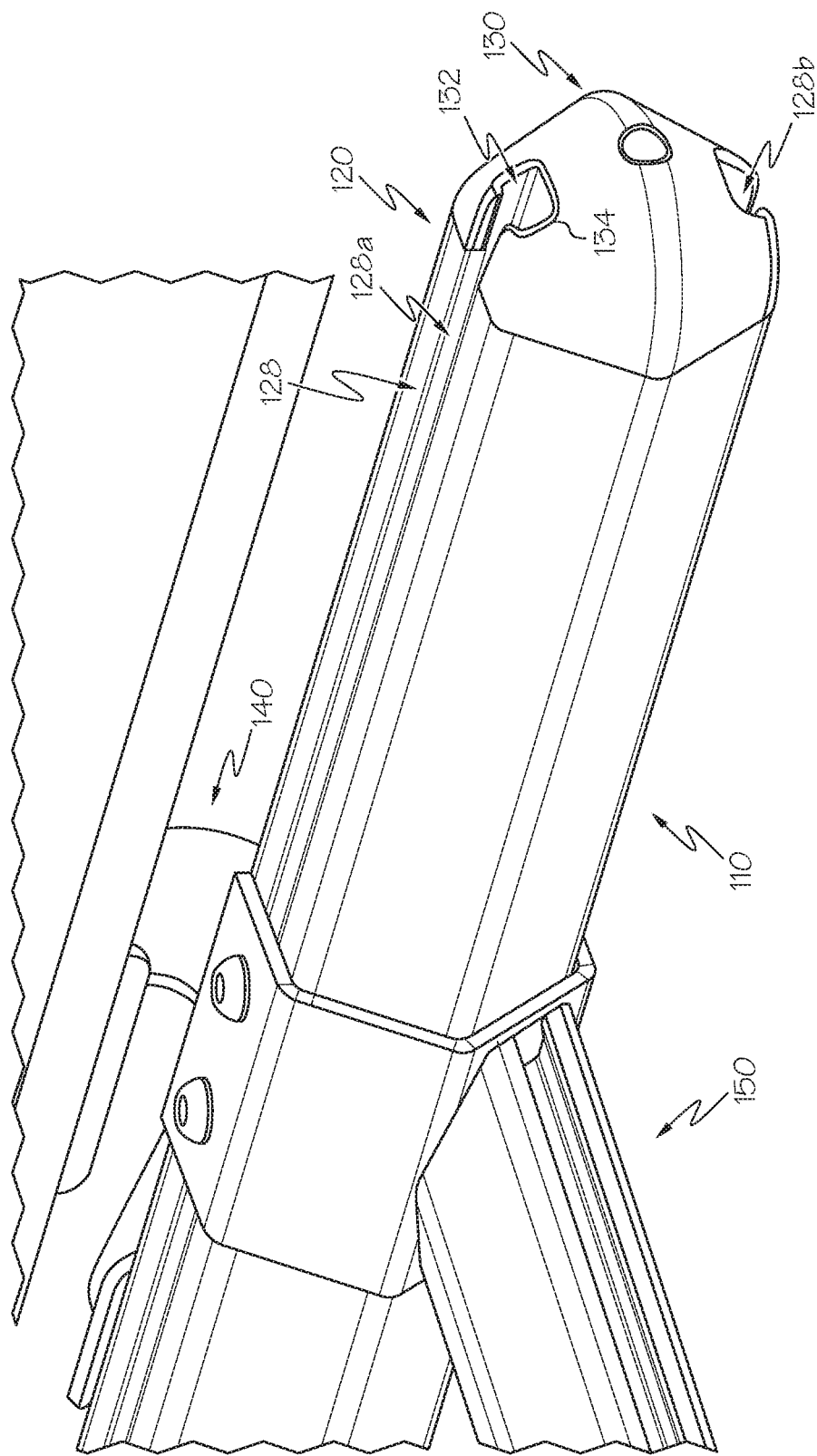
FIG. 5 depicts another an end cap of the side step assembly of side FIG. 1, according to one or more embodiments shown and described herein.

Referring now to FIG. 5, as noted herein above, positioned at either end of the side bar may be an end cap 130. The end cap may be made of the same or a different material than the side bar 110. For example, the end cap may be made from aluminum, steel, plastic, and the like. The end cap 130 is configured to close off the central portion of the side bar 110 to prevent or impair debris and other contaminants from entering to hollow interior of side bar 110. The end cap 130 can also provide an aesthetically pleasing finish to either end of the side bar 110. As illustrated, the end cap 130 can include a continuation 132 of the step attachment channels 128 of the side bar 110. That is the step attachment channel 128 can continue through the end caps to allow attachment of the step 150 to the side bar 110. This can allow a step 150 to be coupled to the side bar 110 before or after the end caps 130 are attached. This may allow for easier removal or addition of a step 150 from or to the side step assembly 100. The end cap 130 may provide an angled entrance 134 to the step attachment channel 128. Such angled entrance 134 may make it easier to add a step 150 to the side step assembly 100. Though not shown, it is contemplated that the bracket attachment channel 129 may also extend through the end cap 130.

Figure 6A:
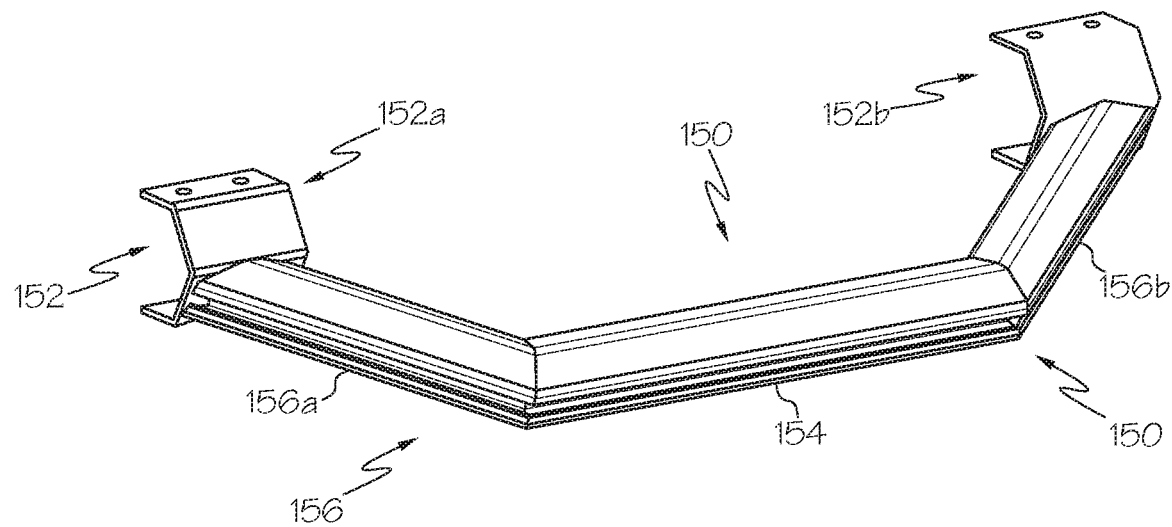
FIG. 6A depicts a step of the side step assembly of FIG. 1, according to one or more embodiments shown and described herein.
Figure 6B:
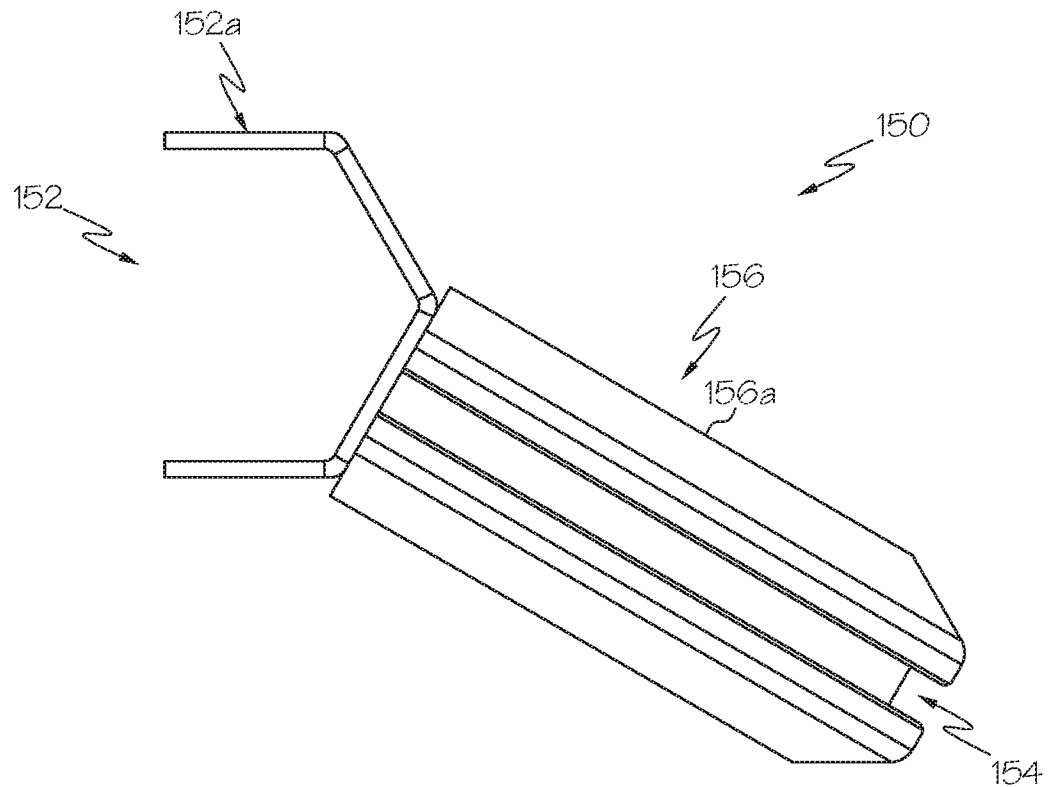
FIG. 6B depicts a side view of the step of FIG. 6A, according to one or more embodiments shown and described herein.
Figure 9:
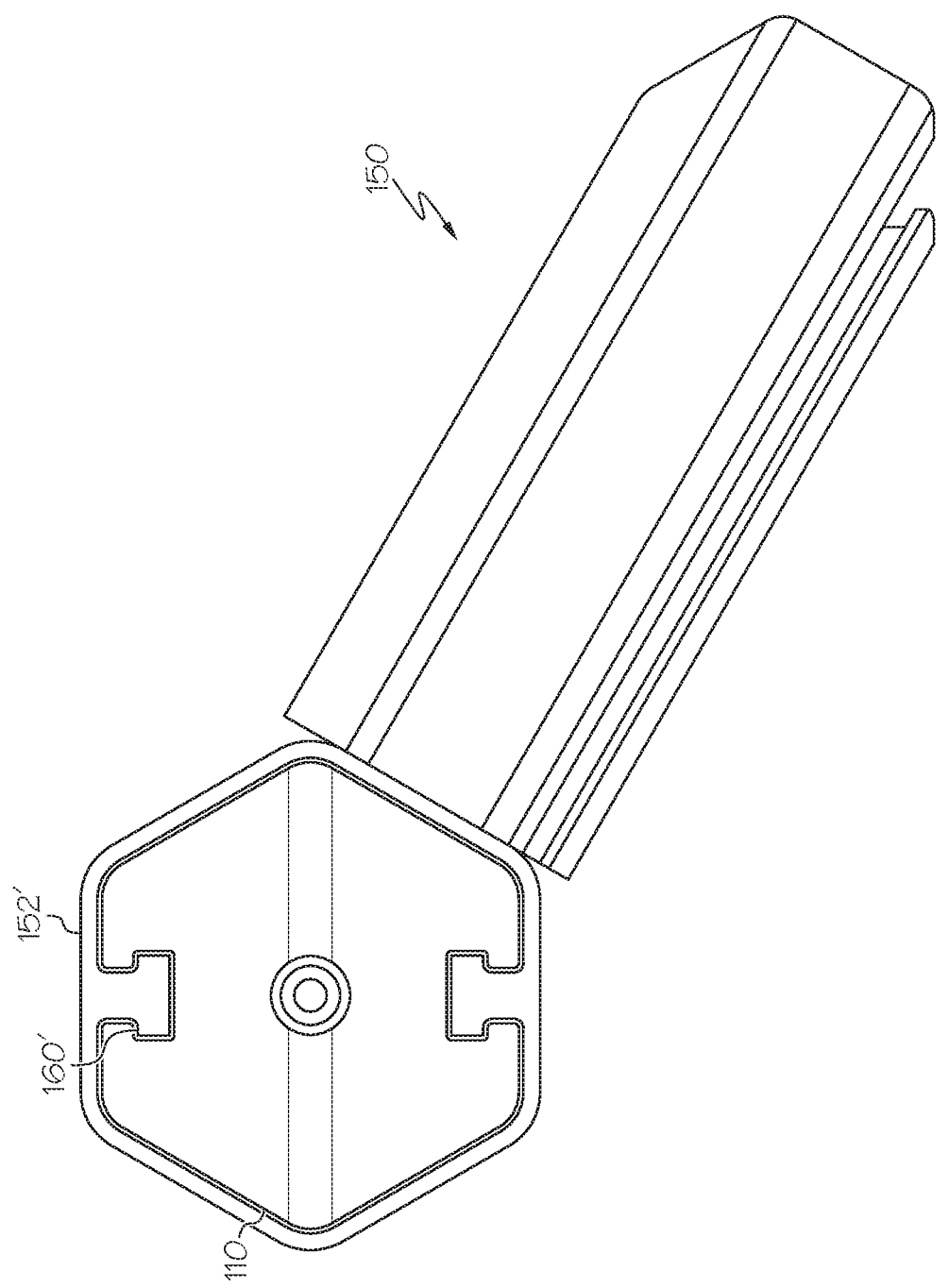
FIG. 9 depicts a cross section of the side step assembly of FIG. 8A, according to one or more embodiments shown and described herein.
Figure 10A:
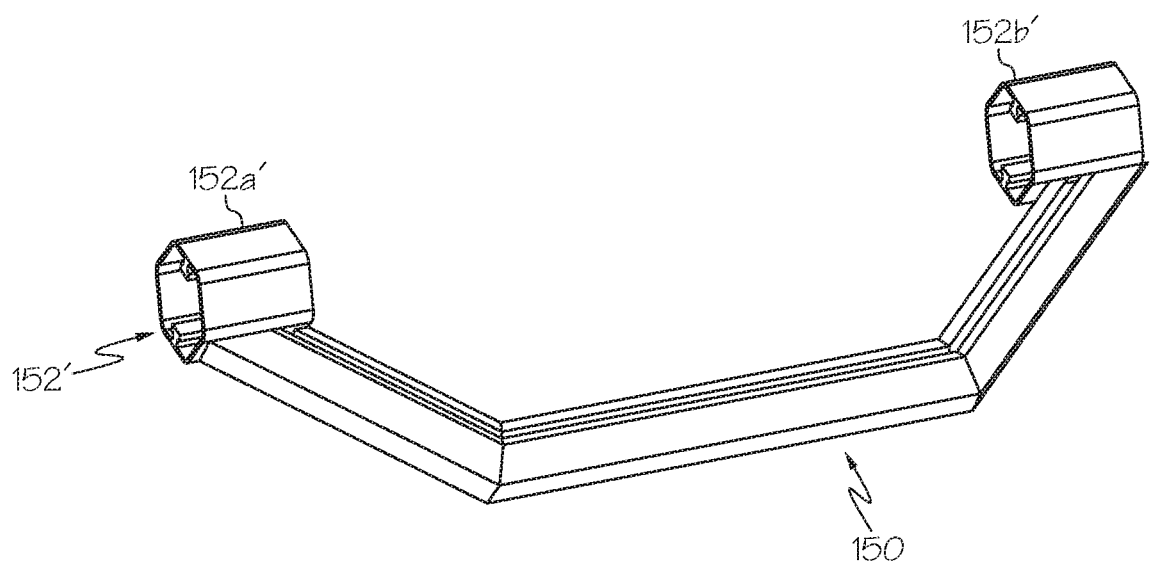
FIG. 10A depicts a perspective view of a step of the side step assembly of FIG. 8A, according to one or more embodiments shown and described herein.
Figure 10B:
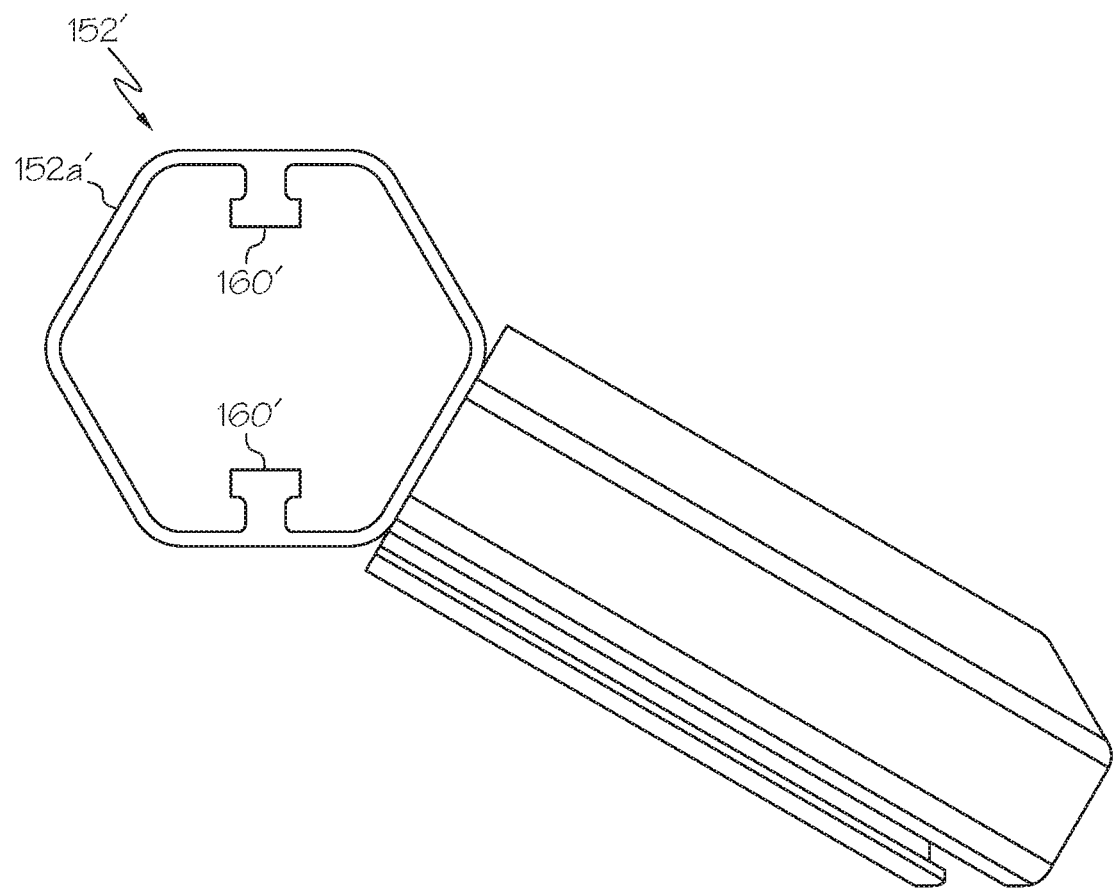
FIG. 10B depicts a side view of the step of FIG. 10A, according to one or more embodiments shown and described herein.
Figure 11A:
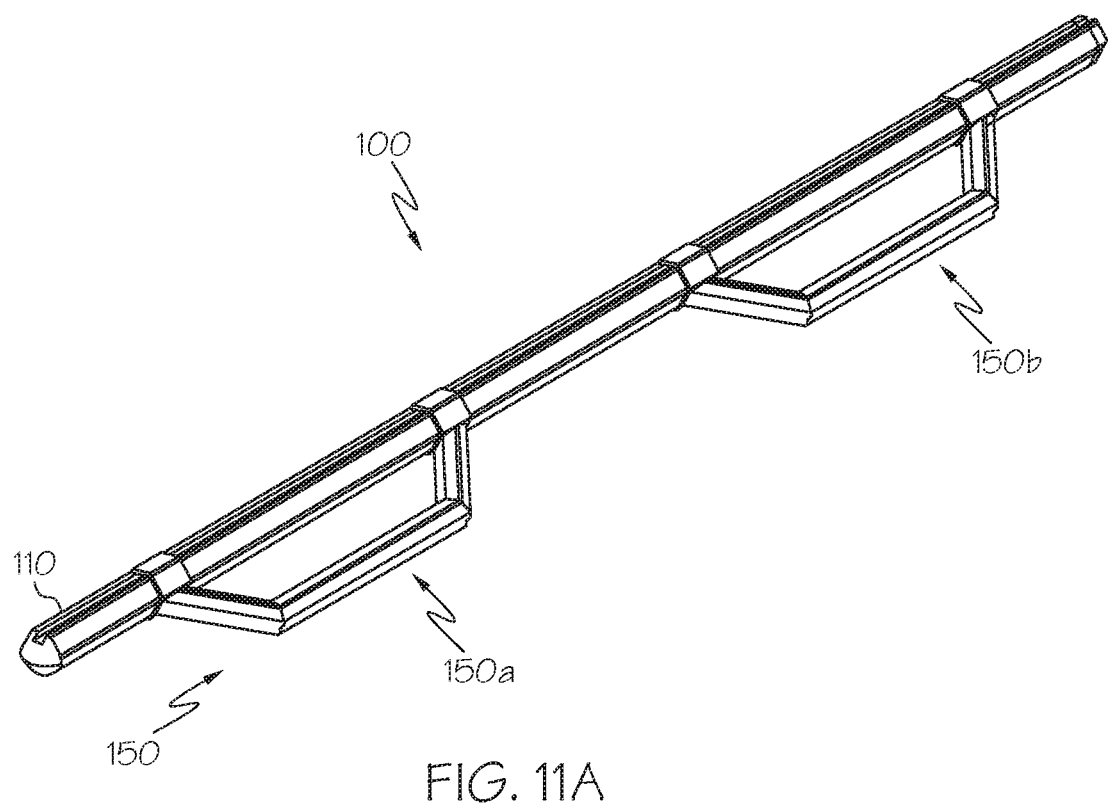
FIG. 11A depicts the side step assembly in FIG. 8A having steps positioned in a first orientation, according to one or more embodiments shown and described herein.
Figure 11B:
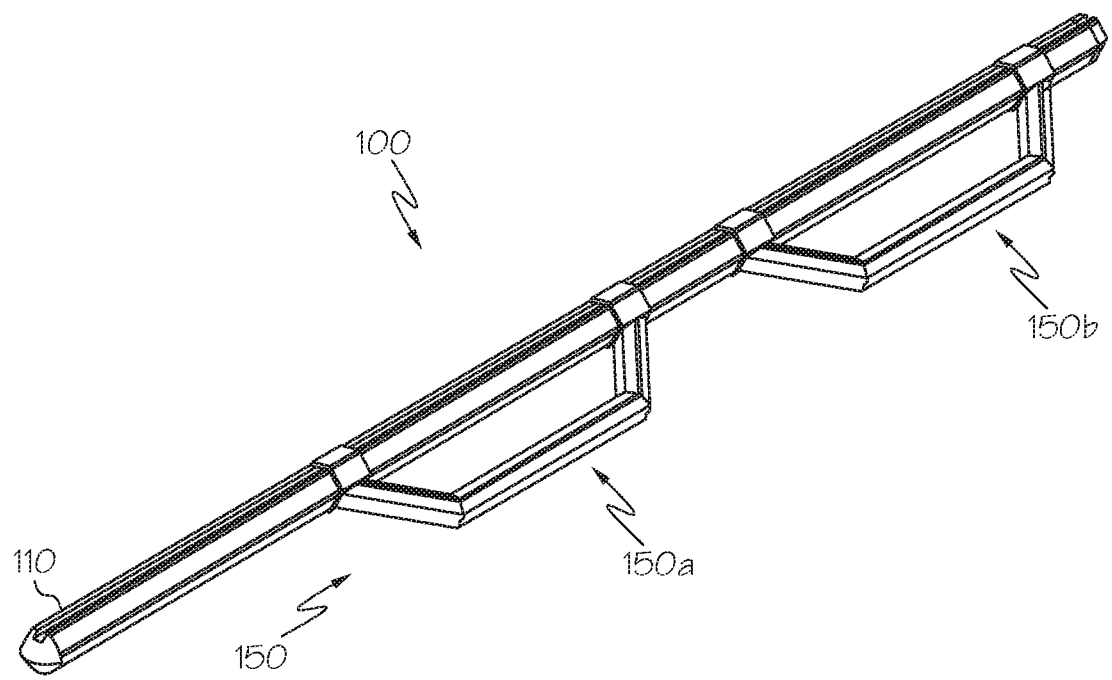
FIG. 11B depicts the side step assembly in FIG. 8A having steps positioned in a second orientation, according to one or more embodiments shown and described herein.
Figure 11C:
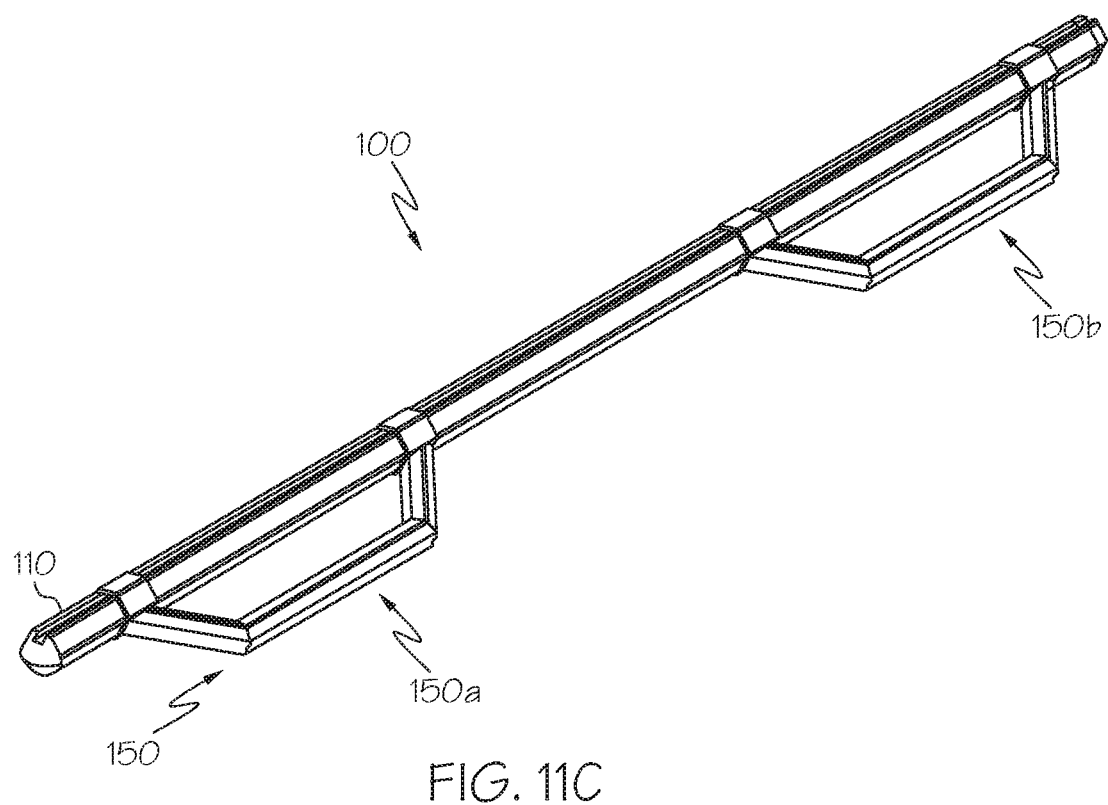
FIG. 11C depicts the side step assembly in FIG. 8A having steps positioned in a third orientation, according to one or more embodiments shown and described herein.
Figure 11D:
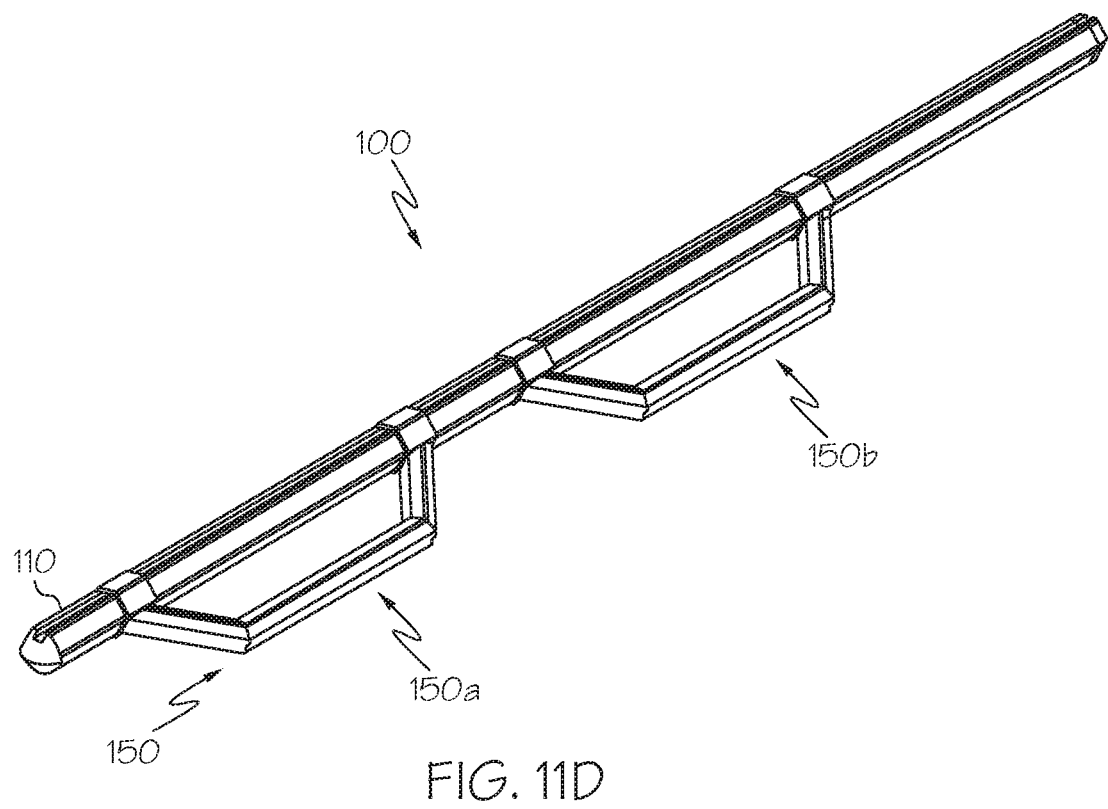
FIG. 11D depicts the side step assembly in FIG. 8A having steps positioned in a fourth location, according to one or more embodiments shown and described herein.

Referring to FIGS. 6A and 6B a perspective view and a side view of a step 150 are respectively depicted. FIGS. 7A-7B illustrate various cross-sections of the step 150 coupled to the side bar 110. Though it is contemplated the step 150 may have many different configurations, the step 150 generally includes a stepping portion 154 configured to allow for ingress and egress to and from a vehicle when the step 150 is coupled to the vehicle 10 and a coupler portion 152, coupled to the stepping portion 154 which is configured to couple the step 150 to the side bar 110. In some embodiments, a step support portion 156 extends between and couples the stepping portion to the coupler portion 152 and projects the stepping portion 154 in an outboard direction of the vehicle 10 (see FIG. 1B). The step 150 may be constructed of any suitable material, for example, aluminum, steel, plastic and the like.

The stepping portion 154 may be a hollow tube manufactured through any suitable process, for example, extrusion. FIG. 7B illustrates a cross-sectional view of the stepping portion 154. The stepping portion 154 may have an outer cross-section perimeter 153 (as indicated by the dashed line). The outer cross-section perimeter 153 of the stepping portion 154 may be any suitable polygonal or non-polygonal shape (e.g., triangles, squares, rectangles, circles, ovals, etc.). In the present embodiments, the outer cross-section perimeter 153 of the stepping portion 154 is hexagonal in shape.

In some embodiments, similar to the side bar 110, extending inward from the outer cross-section perimeter 153 of the stepping portion 154 may be one or more channels 155. The one or more channels 155 may extend along an entire length of the stepping portion, or only a portion thereof. In some embodiments, the side bar 110 comprises more than one channel 155 for example, two channels, three channels, four channels, etc. The present embodiment includes two channels 155a 155b. The one or more channels 155 may facilitate coupling various accessories to the stepping portion 154 of the step 150. For example, the a step surface may be coupled to the one or more channels 155 of the stepping portion 154 to provide a larger, more comfortable surface for stepping for the user. The one or more channels 155 of the stepping portion 154 may have substantially the same construction of the one or more channels 120 of the side bar 110. For instance, the one or more channels of the stepping portion 154 can include a base wall 180 defining a depth of the channel 155, opposing side walls 182a, 182b extending from the base wall 180 to an outer wall 181 of the stepping portion 154, and retaining flanges 184a, 184b extending from the side walls 182a, 182b to define a slot 185. The side walls 182a, 182b may be parallel to one another and normal to the base wall 180. The retaining flanges 184a, 184b may be perpendicular to the side walls 182a, 182b. The retaining flanges 184a, 184b may extend the entire length of the channel 155. An accessory may couple to the one or more channels 155 in substantially the same manner as noted herein in regards to either the side bar 110 coupling with the attachment bracket 140 or the step 150, further described below.

Referring again to FIG. 6A, a step support portion 156 may extend from the stepping portion 154 to the coupler portion 152. The step support portion 156 may be coupled to the stepping portion 154 at any location along the stepping portion 154. In the present embodiment, there are two step support portions 156a, 156b extending from both ends of the stepping portion 154 up to respective coupler portions 152a, 152b, such that the step 150 resembles a hoop (or U-shape) when coupled to the side bar 110. In some embodiments, the step support portion 156 may be coupled at only one end of the stepping portion 154 such that the step 150 has an L-shaped appearance. In other embodiments, the step support portion 156 may be coupled in the middle of the stepping portion 154 such that the step 150 has a T-shaped appearance.

Referring to FIG. 7A, a cross section of the step support portion 156 is illustrated. The step support portion 156 may have a substantially identical construction to the stepping portion 154 of the step 150. For example, the step support portion 156 may be a hollow tube manufactured through any suitable process, for example, extrusion. Further, one or more channels 155 of the stepping portion 154 can continue through the step support portion 156. In some embodiments, the step support portion 156 is integrally formed with the stepping portion 154. In other embodiments, they are separate components that are coupled together through any conventional coupling techniques (e.g., welding, brazing, and the like).

The coupler portion 152 of the step 150 may be coupled to the rest of the step 150 through any conventional coupling techniques (e.g., fastening, welding, brazing, and the like). The coupler portion 152 is configured to receive the side bar 110. The coupler portion 152 may be shaped so as to match a portion of the outer cross-section perimeter 112 of the side bar 110, for example, the coupler portion 152 can be a partial sleeve that covers a portion of the outer cross-section perimeter of the side bar 110. In the present embodiment, the side bar 110 includes a hexagonal outer cross-section perimeter 112 (see FIG. 3A). The coupler portion 152 includes several wall portions (e.g., 163*a*, 163*b*, 163*c*, 163*d*) that are angled relative to one another so as to wrap around the outer cross-section perimeter 112 of the side bar 110. The coupler portion 152 overlaps with one or more of the step attachment channels 128. For example, the coupler portion 152 interfaces with a step attachment channel 128 at the top of the side bar 110 and a step attachment channel 128 at a bottom of the side bar 110. As noted herein, though a hexagonal outer cross-section perimeter 112 is generally illustrated in the figures, it is contemplated that the side bar 110 can have other cross-sections including other polygonal (e.g., squares, rectangles, triangles, etc.) or non-polygonal (e.g., round, oblong, etc.) shapes. In either case, the coupler portion 152 of the step 150 can be shaped so as to match a portion of the outer cross-section perimeter 112 of the side bar 110 and attach to the side bar 110 at a location where the coupler portion 152 matches the outer cross-section perimeter 112 of side bar 110.

To couple the coupler portion 152 to the side bar 110, the step 150 may further include a step coupler 160 configured to extend from coupler portion 152 and slidingly fit within the step attachment channel 128. Step coupler 160 may be similar in structure to the bracket coupler 144 described herein. For example, the step coupler 160 includes a retained portion 192 that is configured to sit within a main cavity 173 of the step attachment channel 128 and a neck portion 194 that extends from the retained portion 192 and through the slot 127. The retained portion 192 of the step coupler 160 can be sized so as to be able to slide within the step attachment channel 128 but unable to spin. For example, the retained portion 192 of the step coupler 160 may have a polygonal shape (e.g., hexagon) sized such that the side walls 124*a*, 124*b* of the step attachment channel 128 block rotation of the retained portion 192. A portion of the neck portion 194 may be threaded and the retained portion 192 may be configured to traverse the threads of the neck portion 194 so as to tighten the step 150 to the side bar 110. The step coupler 160 may include a head portion 186 that is situated on the outside of the coupler portion 152 that can be spun with a tool. The head portion 186 can be integrally formed with the neck portion 194 (e.g., such as a bolt or other threaded fastener). When the head portion 186 is spun the retained portion 192 (e.g., a nut), which is prevent from spinning by the sides walls 124*a*, 124*b* of the step attachment channel 128, traverses the threads of the neck portion 194 to either tighten or loosen the coupler portion 152 to the side bar 110. When tightened, the step 150 is prevented from moving along the side bar 110. When loosened, the step 150 (by way of the retained portion 192 can slide along the step attachment channel 128 to any desired location.

Referring again to FIGS. 3A and 3B, the coupler portion 152 of the step 150 and the side bar attachment portion 143 of the attachment bracket 140 may be sized so that the coupler portion 152 of the step is able to slide past the side bar attachment portion 143 of the step 150. In this way, the side bar attachment portion 143 does not interfere with the adjustability of the step 150 along the side bar 110.

Accordingly, to adjust the step 150 along the side bar 110 of the side step assembly 100, the step coupler 160 may be inserted into or otherwise within the step attachment channel 128 of the side bar 110. The step 150, along with the step coupler 160, may be slide to a desired location along the length of the side bar 110. For example, FIGS. 11A-11D illustrate various positions that the steps 150*a*, 150*b*, of any of the described embodiments, can be positioned at along the side bar 110. Once, the step 150*a* and/or 150*b* is positioned at the desired location, the step coupler 160, illustrated in FIGS. 3A and 3C, can be tightened to the side bar 110 as described herein. This may immovably couple the step 150 to the side bar 110 at the desired location. To reposition the step 150 to a different desired location, the step coupler can be loosened to allow the step 150 to slide along the step attachment channel 128 of the side bar 110.

FIGS. 8A-10C illustrate another embodiment to the side step assembly 100. In this embodiment, the step 150 has a coupler portion 152' (e.g., coupler portions 152*a'*, 152*b'*) that completely wraps around the side bar 110 and step couplers 160' that are integrally formed with the coupler portion 152'. In this embodiment, the steps 150 can be assembled to the side bar 110 before the side bar 110 is coupled to the vehicle 10 as the attachment bracket 140 (see FIG. 1A) may block movement of the step 150 relative to the side bar 110.

Though the side step assembly 100 has been described such that the side bar 110 comprises a channel 120 and the step comprises a step coupler 160 that interlocks with the channel 120 of the side bar 110. In some embodiments, the side bar 110 may include a ridge (not shown) that extends along the length of the side bar 110 and the step 150 includes a channel that interlocks with the ridge, such that the step 150 is able to traverse a length of the side bar 110 through its coupling to the ridge. A fastener may be use to couple the channel of the step 150 to the ridge of the side bar 110. Embodiments can be described with reference to the following numbered clauses, with preferred features laid out in the dependent clauses:

1. A side step assembly comprising: a side bar comprising a channel and configured to be coupled to a vehicle; a step comprising a step coupler, wherein: the step coupler is configured to sit within the channel of the side bar; and the step is configured to selectively translate along the side bar while remaining coupled thereto by the step coupler.

2. The side step assembly of clause 1, wherein: the side bar comprises an outer cross-section perimeter; and the step comprises a coupler portion configured to receive the side bar and shaped to match a portion of the outer cross-section perimeter of the side bar.

3. The side step assembly of clause 2, wherein the step coupler is configured to extend from the coupler portion and into the channel of the side bar.

4. The side step assembly of any of clauses 1-3, wherein the step coupler is configured to be tightened and untightened when inserted into the channel of the side bar such that the step is selectively immovably coupled to the side bar.

5. The side step assembly of any of clauses 1-4, wherein the channel extends along an entire length of the side bar.

6. The side step assembly of any of clauses 1-5, further comprising an end cap configured to be coupled to an end of the side bar, wherein the end cap comprises a continuation of the channel of the side bar such that the channel extends through the end cap.

7. The side step assembly of any of clauses 1-6, wherein: the channel comprises retaining flanges extending along a length of the channel; the step coupler comprises a retained portion and a neck portion extending from the retained portion; and the retained portion is configured to sit within a main cavity of the channel and the neck portion that is configured to be disposed within a slot defined by the retaining flanges when the step is coupled to the side bar.

8. A vehicle comprising an adjustable side step assembly, comprising: a side bar coupled to a frame of the vehicle and comprising a step attachment channel extending along a length of the side bar; and a step comprising a step coupler positioned within the step attachment channel of the side bar, wherein the step is configured to selectively translate along the side bar while remaining coupled thereto by the step coupler.

9. The vehicle of clause 8, further comprising an attachment bracket coupling the side bar to the frame of the vehicle, wherein: the side bar further comprises an attachment bracket channel extending along at least a portion of the length of the side bar; and the attachment bracket is coupled to the attachment bracket channel.

10. The vehicle of clause 8 or 9, wherein: the side bar comprises an outer cross-section perimeter; and the step comprises a coupler portion coupled to the side bar and shaped to match a portion of the outer cross-section perimeter of the side bar.

11. The vehicle of clause 10, wherein the step coupler is configured to extend from the coupler portion of the step and into the step attachment channel of the side bar.

12. The vehicle of any of clauses 8-11, wherein the step coupler is configured to be tightened and untightened such that the step is selectively immovably coupled to the side bar.

13. The vehicle of any of clauses 8-12, wherein the step attachment channel extends along an entire length of the side bar.

14. The vehicle of any of clauses 8-13, further comprising an end cap coupled to an end of the side bar, wherein the end cap comprises a continuation of the step attachment channel of the side bar such that the step attachment channel extends through the end cap.

15. The vehicle of any of clauses 8-14, wherein: the step attachment channel comprises retaining flanges extending along a length of the step attachment channel; and the step coupler comprises a retained portion and a neck portion extending from the retained portion, wherein the retained portion sits within a main cavity of the step attachment channel and the neck portion is disposed within a slot defined by the retaining flanges.

16. A method of adjusting a step along a side bar of a side step assembly, the method comprising: positioning a step coupler of the step within a step attachment channel of the side bar; sliding the step to a location along a length of the side bar, while the step coupler is positioned within the step attachment channel of the side bar; and tightening the step coupler to the side bar, such that the step is immovably coupled to the side bar.

17. The method of clause 16, wherein the step coupler is configured to be loosened and repositioned along the length of the side bar.

18. The method of clause 16 or 17, wherein the step attachment channel comprises: a base wall defining a depth of the step attachment channel; side walls extending from the base wall to an outer wall of the side bar; and retaining flanges extending from the side walls and defining a slot therebetween, wherein the step coupler is retained within the step attachment channel by the retaining flanges when the step is slid along the step attachment channel.

19. The method of clause 18, wherein the step coupler comprises a retained portion that sits within a main cavity of the step attachment channel and a neck portion that extends from the retained portion and through the slot.

20. The method of clause 19, wherein the retained portion of the step coupler is sized so as to be unable to rotate within the step attachment channel.

21. A side step assembly comprising: a side bar configured to be coupled to a vehicle; and a step configured to interlock with the side bar such that the step can selectively translate along the side bar while remaining coupled thereto.

22. The side step assembly of clause 21, wherein: the side bar comprises a ridge; and the step comprises a channel, wherein the channel of the step interlocks with the ridge of the side bar.

23. The side step assembly of clause 21 or 22, wherein the step is configured to translate along an entire length of the side bar while remaining coupled thereto.

24. The side step assembly of any of clauses 21-23, wherein the step is configured to be immovably fixed to the side bar at a predetermined location.

25. A side step assembly comprising: a side bar configured to be coupled to a vehicle; and a step configured to interlock with the side bar such that the step can selectively translate along the side bar while remaining coupled thereto.

26. The side step assembly of clause 25, wherein: the side bar comprises a channel; the step comprises a step coupler, wherein: the step coupler is configured to sit within the channel of the side bar; and the step is configured to selectively translate along the side bar while remaining coupled thereto by the step coupler.

27. The side step assembly of clause 26, wherein: the side bar comprises an outer cross-section perimeter; and the step comprises a coupler portion configured to receive the side bar and shaped to match a portion of the outer cross-section perimeter of the side bar.

28. The side step assembly of clause 27, wherein the step coupler is configured to extend from the coupler portion and into the channel of the side bar.

29. The side step assembly of clause 26, wherein the step coupler is configured to be tightened and untightened when inserted into the channel of the side bar such that the step is selectively immovably coupled to the side bar.

30. The side step assembly of clause 26, wherein the channel extends along an entire length of the side bar.

It should now be understood that embodiments of the present disclosure are directed to vehicle side step assemblies having a step that can be adjusted in a continuously variable fashion along an entire length of a side bar to any desired location. In particular, the step of the side step assembly can interlock with the side bar so as to be able to traverse a length of the side bar, such that the step can be positioned at any desired location. In one embodiment, side bars according to the present disclosure can include a channel formed therein that extends along the entire length of the side bar. The step is configured to interlock with the channel such that the step can be positioned at any desired location along the length of the side bar. Hence, the placement of the step can be customized for any user to satisfy the needs and/or comfort of the user.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A side step comprising a coupler portion that receives a side bar coupled to a vehicle and is configured to engage opposite facing outer surfaces of the side bar at a first side of the side bar and a second opposite side of the side bar and interlocks with the side bar such that the side step can selectively translate along the side bar while remaining coupled thereto.

2. The side step of claim 1, wherein the coupler portion comprises a step coupler configured to sit within a channel of the side bar and the side step is configured to selectively translate along the side bar while remaining coupled thereto by the step coupler.

3. The side step of claim 1, wherein the side step comprises a first coupler portion and a second coupler portion spaced from the first coupler portion.

4. The side step of claim 3, wherein each coupler portion comprises a step coupler configured to sit within a channel of the side bar and the side step is configured to selectively translate along the side bar while remaining coupled thereto by the step couplers of the first coupler portion and the second coupler portion.

5. The side step of claim 3, wherein each coupler portion comprises a first step coupler and a second step coupler.

6. The side step of claim 5, wherein the first step coupler is opposite the second step coupler.

7. The side step of claim 3, further comprising:
a stepping portion; and
a step support portion that extends between and couples the stepping portion to the first and second coupler portions.

8. The side step of claim 1, further comprising:
a stepping portion; and
a step support portion that extends between and couples the stepping portion to the coupler portion.

9. The side step of claim 8, wherein the stepping portion comprises one or more channels formed therein.

10. The side step of claim 1, wherein the coupler portion is a partial sleeve configured to cover a portion of the side bar.

11. An adjustable side step assembly, comprising:
a side bar configured to be coupled to a vehicle; and
a step comprising a coupler portion that receives and extends along an external surface of the side bar so as to wrap around outer surfaces of the side bar at a first outer surface of the side bar and a second opposite outer surface of the side bar, wherein the step can selectively translate along the side bar while remaining coupled thereto.

12. The adjustable side step assembly of claim 11, wherein:
the side bar comprises a channel;
the coupler portion comprises a step coupler, wherein:
the step coupler sits within the channel of the side bar; and
the step selectively translates along the side bar while remaining coupled thereto by the step coupler.

13. The adjustable side step assembly of claim 12, wherein:
the side bar comprises an outer cross-section perimeter; and
the coupler portion receives the side bar and is shaped to match a portion of the outer cross-section perimeter of the side bar, such that the coupler portion engages the side bar at a first location on the first outer surface of the side bar and a second location on the second opposite outer surface of the side bar across a cross-section of the side bar.

14. The adjustable side step assembly of claim 13, wherein the step coupler is configured to extend from the coupler portion and into the channel of the side bar.

15. The adjustable side step assembly of claim 12, wherein the step coupler is configured to be tightened and untightened when inserted into the channel of the side bar such that the step is selectively immovably coupled to the side bar.

16. The adjustable side step assembly of claim 12, wherein the channel extends along an entire length of the side bar.

17. The adjustable side step assembly of claim 12, wherein:
the channel comprises retaining flanges extending along a length of the channel;
the step coupler comprises a retained portion and a neck portion extending from the retained portion; and
the retained portion is configured to sit within a main cavity of the channel and the neck portion that is configured to be disposed within a slot defined by the retaining flanges when the step is coupled to the side bar.

18. The adjustable side step assembly of claim 11, wherein the step comprises a first coupler portion and a second coupler portion spaced from the first coupler portion.

19. The adjustable side step assembly of claim 18, wherein each coupler portion comprises a first step coupler and a second step coupler.

20. The adjustable side step assembly of claim 19, wherein the first step coupler is opposite the second step coupler.

* * * * *